US012579932B2

(12) United States Patent
Zhou et al.

(10) Patent No.: US 12,579,932 B2
(45) Date of Patent: Mar. 17, 2026

(54) DISPLAY CONTROL METHOD AND DEVICE FOR A DISPLAY PANEL, STORAGE MEDIUM, AND DISPLAY DEVICE

(71) Applicant: Xiamen Tianma Display Technology Co., Ltd., Xiamen (CN)

(72) Inventors: Hanqiang Zhou, Xiamen (CN); Jian Kuang, Xiamen (CN); Yuheng Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 19/183,746

(22) Filed: Apr. 18, 2025

(65) Prior Publication Data

US 2025/0246132 A1 Jul. 31, 2025

(30) Foreign Application Priority Data

Nov. 27, 2024 (CN) ......................... 202411718194.9

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2320/0626* (2013.01); *G09G 2340/0435* (2013.01)

(58) Field of Classification Search
CPC ... G09G 3/30–3291; G09G 3/34–3406; G09G 3/36–3696; G09G 2320/0626–0653
See application file for complete search history.

(56) References Cited

U.S. PATENT DOCUMENTS

2012/0019160 A1* 1/2012 Lee ........................ H05B 45/10
315/291
2024/0339068 A1* 10/2024 Sun ...................... G09G 3/2092
2025/0149009 A1* 5/2025 Dong ....................... G09G 5/10

* cited by examiner

*Primary Examiner* — Hang Lin
(74) *Attorney, Agent, or Firm* — KDW Firm PLLC

(57) ABSTRACT

Provided are a display control method and device for a display panel, a storage medium, and a display device. The display control method for the display panel includes: in response to a brightness adjustment mode of the display panel being switched, acquiring a first display and light emission duty cycle of the last frame in a current brightness adjustment mode and a second display and light emission duty cycle of the first frame in a brightness adjustment mode to which the display panel is to be switched; determining, according to the first display and light emission duty cycle and the second display and light emission duty cycle, a display and light emission duty cycle of each of at least two transition display frames inserted in a brightness switching process; and controlling the display panel to switch the brightness adjustment mode.

17 Claims, 7 Drawing Sheets

DISPLAY CONTROL METHOD AND DEVICE FOR A DISPLAY PANEL, STORAGE MEDIUM, AND DISPLAY DEVICE

CROSS-REFERENCE TO RELATED APPLICATION

This application claims priority to Chinese Patent Application No. 202411718194.9 filed Nov. 27, 2024, the disclosure of which is incorporated herein by reference in its entirety.

TECHNICAL FIELD

Embodiments of the present disclosure relate to the field of display technology and, in particular, to a display control method and device for a display panel, a storage medium, and a display device.

BACKGROUND

A display panel includes multiple pixels arranged in an array. Each pixel is controlled to perform a display and emit light so that the display panel can show a corresponding image. When the display panel displays the image, the display brightness of the display panel is adjusted purposefully according to actual display requirements. This ensures that the display panel has relatively low power consumption and a viewing comfort requirement of a user is satisfied.

At present, a display panel has multiple brightness adjustment modes. For example, the brightness adjustment modes of the display panel may include a direct current (DC) mode and a pulse width modulation (PWM) mode. In the DC mode, the power of each pixel in the display panel is adjusted such that the display brightness of the display panel is adjusted. Moreover, the greater the power, the higher the brightness, and the less the power, the lower the brightness. In the PWM mode, the duration for which pixels perform a display and emit light is controlled such that the brightness is adjusted. Moreover, the rate at which the pixel alternates between a light emission state and a non-light emission state is a PWM refresh rate. Typically, when the display brightness of the display panel varies within a low brightness range, the display brightness of the display panel may be adjusted through the PWM mode, and when the display brightness of the display panel varies within a high brightness range, the display brightness of the display panel may be adjusted through the DC mode.

However, when the display panel needs to switch a brightness mode, the change of the mode for controlling the pixels in the display panel to perform a display and emit light leads to a relatively significant variation in the display brightness of the display panel. As a result, a screen flicker appears in the display panel, thereby influencing the display effect of the display panel.

SUMMARY

The present disclosure provides a display panel and a display control method and device for the display panel, a storage medium, and a display device to improve a screen flicker caused by switching a display brightness mode and enhance the display effect of the display panel.

In a first aspect, the present disclosure provides a display control method for a display panel. The display control method for the display panel includes the steps below.

In response to a brightness adjustment mode of the display panel being switched, a first display and light emission duty cycle of the last frame in a current brightness adjustment mode and a second display and light emission duty cycle of the first frame in a brightness adjustment mode to which the display panel is to be switched are acquired.

A display and light emission duty cycle of each of at least two transition display frames inserted in a brightness switching process is determined according to the first display and light emission duty cycle and the second display and light emission duty cycle, where the at least two transition display frames include at least one of a first transition display frame or a second transition display frame, a display and light emission duty cycle of the first transition display frame is equal to the first display and light emission duty cycle, a display and light emission duty cycle of the second transition display frame is equal to the second display and light emission duty cycle, and a display refresh rate of each of the at least two transition display frames is higher than or equal to a current display refresh rate of the display panel.

The display panel is controlled to switch the brightness adjustment mode according to the display and light emission duty cycle of each of the at least two transition display frames.

In a second aspect, the present disclosure further provides a display control device for a display panel. The display control device for the display panel includes a duty cycle acquisition module, a duty cycle determination module, and a mode switching control module.

In response to a brightness adjustment mode of the display panel being switched, the duty cycle acquisition module is configured to a first display and light emission duty cycle of the last frame in a current brightness adjustment mode and a second display and light emission duty cycle of the first frame in a brightness adjustment mode to which the display panel is to be switched.

The duty cycle determination module is configured to determine, according to the first display and light emission duty cycle and the second display and light emission duty cycle, a display and light emission duty cycle of each of at least two transition display frames inserted in a brightness switching process, where the at least two transition display frames include a first transition display frame and/or a second transition display frame, a display and light emission duty cycle of the first transition display frame is equal to the first display and light emission duty cycle, and a display and light emission duty cycle of the second transition display frame is equal to the second display and light emission duty cycle.

The mode switching control module is configured to control the display panel to switch the brightness adjustment mode according to the display and light emission duty cycle of each of the at least two transition display frames.

In a third aspect, the present disclosure further provides a display device. The display device includes a display panel and a driver chip.

The driver chip is configured to drive the display panel to display an image and perform the preceding display control method for the display panel.

In a fourth aspect, the present disclosure further provides a computer-readable storage medium storing a computer instruction, where when executing the computer instruction, a processor performs the preceding display control method for the display panel.

According to the technical solutions in the present disclosure, when the brightness adjustment mode of the display panel is switched, the first display and light emission duty cycle of the last frame in the current brightness adjustment mode and the second display and light emission duty cycle of the first frame in the brightness adjustment mode to which the display panel is to be switched are acquired, and the display and light emission duty cycle of each of the at least two transition display frames inserted in the brightness switching process is determined according to the first display and light emission duty cycle and the second display and light emission duty cycle. In addition, the at least two transition display frames include at least one of the first transition display frame or the second transition display frame. Moreover, the display and light emission duty cycle of the first transition display frame is equal to the first display and light emission duty cycle, and the display and light emission duty cycle of the second transition display frame is equal to the second display and light emission duty cycle so that when the display panel is controlled according to the display and light emission duty cycle of each of the at least two transition display frames to switch the brightness adjustment mode, a display and light emission duty cycle of at least one transition display frame among the at least two transition display frames is the same as the first display and light emission duty cycle of the last frame in the current brightness adjustment mode and/or the second display and light emission duty cycle of the first frame in the brightness adjustment mode to which the display panel is to be switched.

DETAILED DESCRIPTION

To make the objects, technical solutions, and advantages of the present disclosure clearer, the technical solutions of the present disclosure are completely described below in conjunction with the specific embodiments and the drawings in the embodiments of the present disclosure. Apparently, the embodiments described below are part, not all, of the embodiments of the present disclosure. It is apparent to those skilled in the art that various modifications and variations may be made in the present disclosure without departing from the spirit or scope of the present disclosure. Therefore, the present disclosure is intended to cover modifications and variations of the present disclosure that fall within the scope of the corresponding claims (the claimed technical solutions) and equivalents thereof.

In addition, the terms “first”, “second”, and the like used in the embodiments of the present disclosure are used for distinguishing different components but not used for describing any order, quantity, or significance. Similarly, the term “one”, “a”, “the”, or the like does not indicate a quantitative limit, but indicates the existence of at least one. The term “including”, “comprising”, or the like indicates that an element or an object before the term covers an element or an object and their equivalents listed behind the term, but does not exclude another element or object. The term “connected”, “connected to each other”, or the like is not limited to physical or mechanical connections, but may include electrical connections, whether it is direct or indirect. “On”, “below”, “left”, “right”, and the like are only used for indicating a relative positional relationship, and when the absolute position of a described object is changed, the relative positional relationship may also change accordingly. In addition, the description of being the same and equal involved in the embodiments of the present disclosure does not indicate that two objects are completely equal in size and the same in shape. The two objects are allowed to be approximately the same or approximately equal within a certain error range.

It is to be noted that if not in collision, the embodiments of the present disclosure may be combined with each other.

Figure 1:
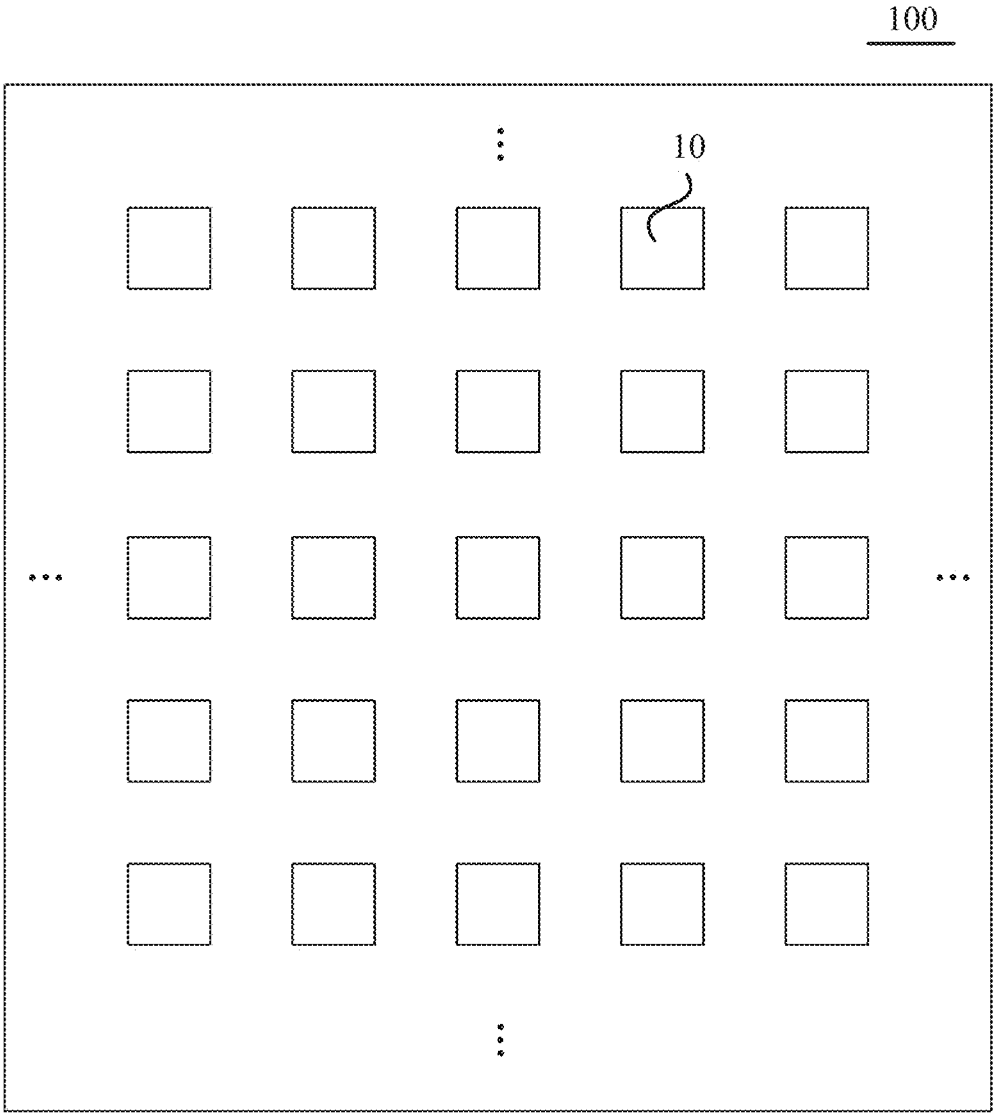
FIG. 1 is a structural diagram of a display panel according to an embodiment of the present disclosure.

FIG. 1 is a structural diagram of a display panel according to an embodiment of the present disclosure. As shown in FIG. 1, a display panel 100 includes multiple pixels 10 arranged in an array. Data signals are provided for the pixels 10 in a one-to-one correspondence so that the pixels 10 can perform a display and emit light according to the data signals, thereby allowing the display panel 100 to show a corresponding image.

It is to be understood that the display panel 100 may be either a self-luminous display panel or a non-self-luminous display panel. The type of the display panel 100 is not specifically limited in the embodiment of the present disclosure. When the display panel 100 is a self-luminous display panel, each pixel 10 of the pixels 10 of the display panel 100 may include a pixel circuit and a light-emitting element. The pixel circuit can control the brightness of the light-emitting element according to a received data signal, thereby enabling the display panel 100 to show the corresponding display image. When the display panel 100 is a non-self-luminous display panel, the pixels 10 in the display panel 100 may implement a display and emit light by reflecting or transmitting light from an external light source. For example, when the display panel 100 is a liquid crystal display panel, each of the pixels 10 of the display panel 100 may include a pixel electrode, a common electrode, and a liquid crystal layer. The pixel electrode and the common electrode may generate a corresponding electric field according to a received data signal and a received common voltage signal. This electric field can control liquid crystal molecules in the liquid crystal layer to twist, so as to adjust the transmittance of light provided by a backlight module. In this manner, the pixels 10 perform a display and emit light, thereby allowing the display panel 100 to show the corresponding display image. For ease of description, unless special limitations are made, the technical solutions in the embodiments of the present disclosure are illustrated using an example in which the display panel is a self-luminous display panel in the embodiments of the present disclosure.

With continued reference to FIG. 1, when displaying an image, the display panel 100 can control, according to the light brightness of the environment where the display panel 100 is located or a brightness adjustment instruction inputted by a user, the display brightness of the displayed image shown by the display panel 100 to vary within a certain brightness adjustment range. Exemplarily, when the light in the surrounding environment of the display panel has relatively high brightness, the display image shown by the display panel needs to have relatively high display brightness. This is convenient for the user to see the display image of the display panel. Conversely, when the light in the surrounding environment has relatively low brightness, the display image of the display panel may have relatively low display brightness so that the display image is prevented from having relatively high brightness to cause relatively high power consumption and influence the eyesight of the user. In this manner, when the brightness of the light in the surrounding environment of the display image varies or when the brightness adjustment instruction inputted by the user is changed, it is necessary to adjust the display brightness of the display image presented by the display panel 100.

Display brightness adjustment modes of the display panel may include a DC mode and a PWM mode. When the brightness adjustment mode of the display panel 100 is the DC mode, the correspondence between a brightness level (that is, a grayscale) of the pixel 10 and a voltage of the data signal may be controlled, that is, when the display panel has different display brightness, the data signal corresponding to the same grayscale has different voltages. Thus, the pixel circuit in the same pixel 10 provides different drive currents for the light-emitting element according to received data signals, thereby adjusting the display brightness of the image displayed by the display panel 100. When the brightness adjustment mode of the display panel 100 is the PWM mode, the ratio of light emission duration of the pixel 10 to non-light emission duration of the pixel 10 may be controlled, that is, when the display panel 100 has different display brightness, the pixel 10 has different ratios of the light emission duration to the non-light emission duration. Thus, human eyes perceive different integral amounts of the brightness of the pixel 10 over time, thereby adjusting the display brightness of the image displayed by the display panel 100.

Figure 2:
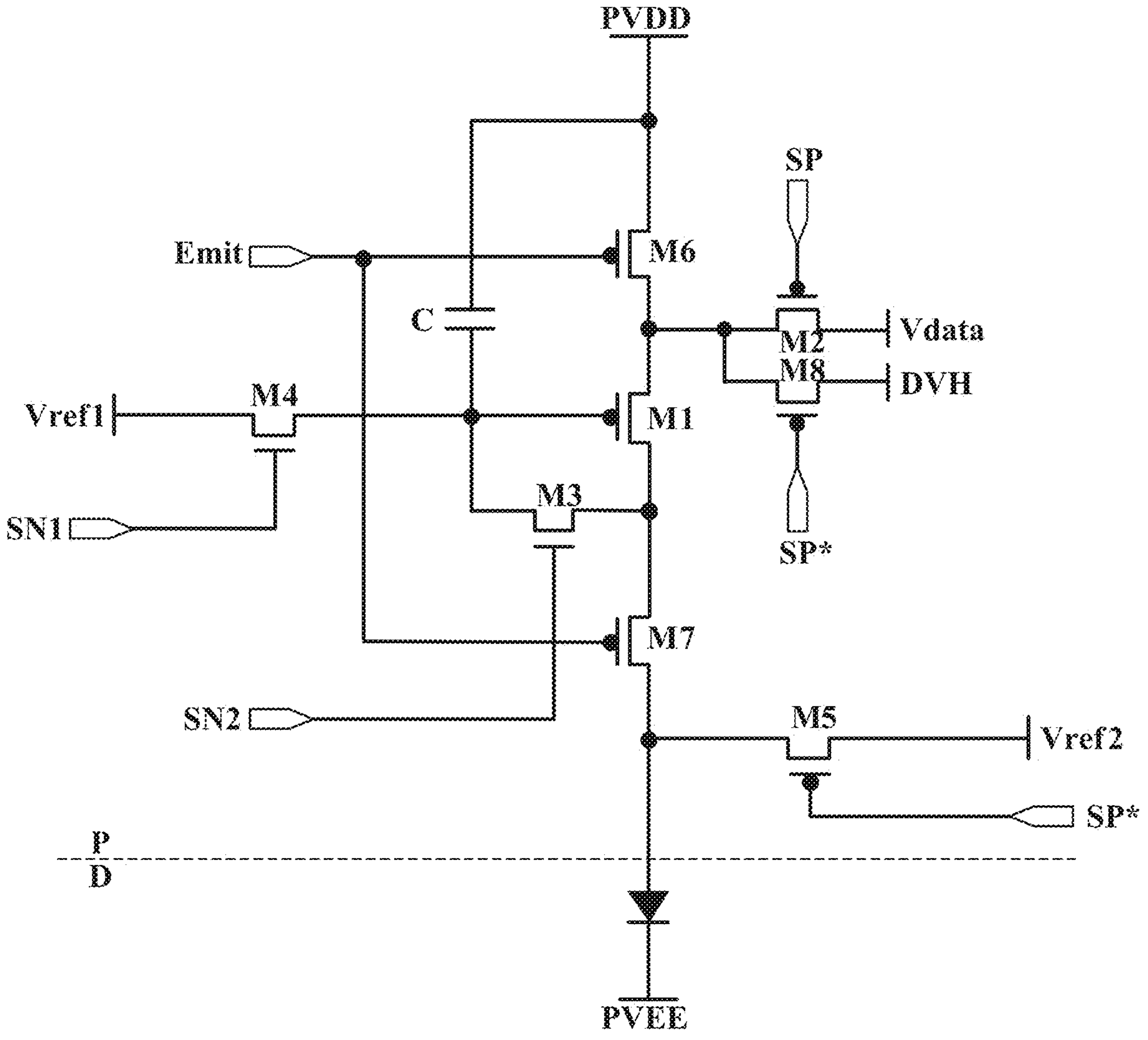
FIG. 2 is a structural diagram of a pixel in a display panel according to an embodiment of the present disclosure.
Figure 3:
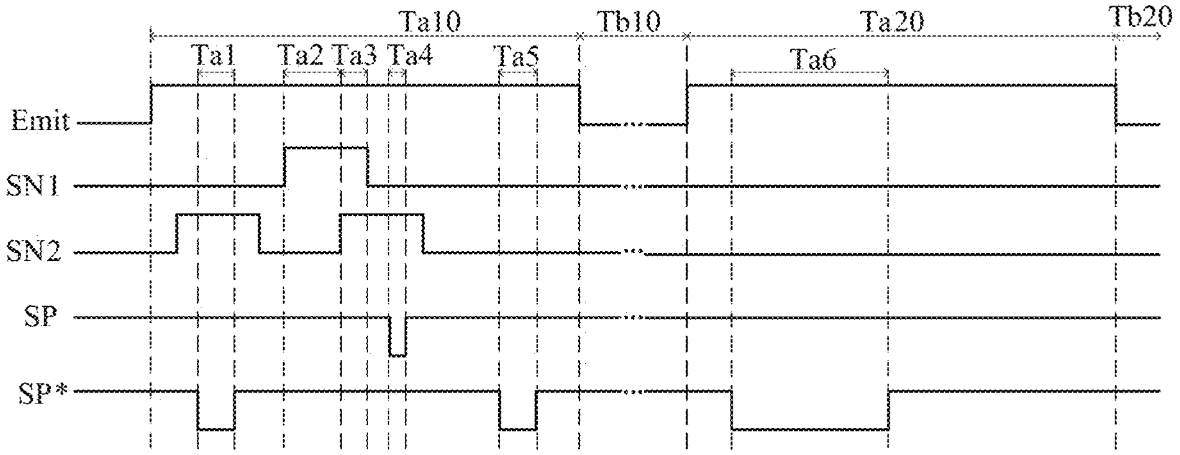
FIG. 3 is a drive timing graph of a pixel in a display panel according to an embodiment of the present disclosure.

Exemplarily, FIG. 2 is a structural diagram of a pixel in a display panel according to an embodiment of the present disclosure, and FIG. 3 is a drive timing graph of a pixel in a display panel according to an embodiment of the present disclosure. Referring to FIGS. 2 and 3, the pixel 10 includes a pixel circuit P and a light-emitting element D. The pixel circuit P may include a drive transistor M1, a write transistor M2, a compensation transistor M3, a reset transistor M4, an initialization transistor M5, a first light emission control transistor M6, a second light emission control transistor M7, a bias adjustment transistor M8, and a storage capacitor Cst. The reset transistor M4 may control a reset signal Vref1 to be transmitted to the gate of the drive transistor M1. The data write transistor M2 may control the data signal to be transmitted to the first electrode of the drive transistor M1. The compensation transistor M3 may provide a compensation for a threshold voltage Vth of the drive transistor M1. The bias adjustment transistor M8 can perform a bias adjustment on the drive transistor M1. The initialization transistor M5 can control an initialization signal Vref1 to be transmitted to the first electrode of the light-emitting element D to initialize the light-emitting element D. The first light emission control transistor M6 and the second light emission control transistor M7 may control a current path to be formed between a positive power supply signal PVDD and a negative power supply signal PVEE so that a drive current generated by the drive transistor M1 according to a gate voltage of the drive transistor M1 can be provided for the light-emitting element D to drive the light-emitting element D to emit light. The storage capacitor Cst is configured to store the gate voltage of the drive transistor M1.

When the display panel has a relatively low display refresh rate, a drive cycle of the pixel 10 may include a refresh frame and at least one holding frame within a display period of one frame. When a display refresh rate of the display panel is the highest display refresh rate that can be achieved by the display panel, the drive cycle of the pixel 10 may include only the refresh frame within the display period of one frame. For example, when the display panel has the relatively low display refresh rate, the refresh frame may include a non-light emission stage Ta10 and a light emission stage Tb10, and each of the at least one holding frame may include a non-light emission stage Ta20 and a light emission stage Tb20. The non-light emission stage Ta10 of the refresh frame may include at least a first bias adjustment stage Ta1, a reset stage Ta2, a second bias adjustment stage Ta3, a write stage Ta4, and a third bias adjustment stage Ta5. The non-light emission stage Ta20 of each of the at least one holding frame may include a fourth bias adjustment stage Ta6. In this case, the non-light emission duration of the pixel 10 includes at least the non-light emission stage Ta10 of the refresh frame and the non-light emission stage Ta20 of each of the at least one holding frame. The light emission stage Tb10 of the refresh frame and the light emission stage Tb20 of each of the at least one holding frame may each include the light emission duration of the pixel 10.

In the non-light emission stage Ta10 of the refresh frame, a light emission control signal Emit is at an inactive level so that the first light emission control transistor M6 and the second light emission control transistor M7 are in the off state. No current is generated between the positive power supply signal PVDD and the negative power supply signal PVEE, and the light-emitting element D of the pixel 10 does not emit light.

In the first bias adjustment stage Ta1 of the non-light emission stage Ta10, a scanning signal SP* controls the bias adjustment transistor M8 and the initialization transistor M5 to be turned on, and a scanning signal SN2 controls the compensation transistor M3 to be turned on. Thus, a bias adjustment signal DVH can be sequentially written into the first electrode, second electrode, and gate of the drive transistor M1, thereby causing the potentials of the first electrode, second electrode, and gate of the drive transistor M1 to remain consistent. In this manner, the problem is alleviated that the drive transistor M1 is in a bias state for a long duration within a display period of a previous frame, resulting in a threshold drift of the drive transistor M1 due to a hysteresis effect. In addition, an initialization signal Vref2 is written into the first electrode of the light-emitting element D to initialize the first electrode of the light-emitting element D so that the signal written into the first electrode of the light-emitting element D within the display period of the previous frame is prevented from influencing the display brightness of a current display image.

In the reset stage Ta2 of the non-light emission stage Ta10, a scanning signal SN1 may control the reset transistor M4 to be turned on, and the reset signal Vref1 can be transmitted to the gate of the drive transistor M1 through the reset transistor M4 to reset the gate of the drive transistor M1.

In the second bias adjustment stage Ta3 of the non-light emission stage Ta10, the scanning signal SN1 continues controlling the reset transistor M4 to be turned on. In addition, the scanning signal SN2 controls the compensation transistor M3 to be turned on. Thus, the reset signal Vref1 can be continuously transmitted to the second and first electrodes of the drive transistor M1 through the compensation transistor M3 so that the potentials of the first electrode, second electrode, and gate of the drive transistor M1 remain consistent, thereby performing a bias adjustment on the drive transistor M1 and making full preparations for writing a data signal Vdata.

In the write stage Ta4 of the non-light emission stage Ta10, a scanning signal SP controls the write transistor M2 to be turned on, and the scanning signal SN2 continues controlling the compensation transistor M3 to be turned on. Thus, the data signal Vdata can be transmitted to the gate of the drive transistor M1 through the write transistor M2, the drive transistor M1, and the compensation transistor M3 sequentially and the threshold voltage of the drive transistor M1 is applied to the gate of the drive transistor M1 as a compensation.

In the third bias adjustment stage Ta5 of the non-light emission stage Ta10, the scanning signal SP* controls the bias adjustment transistor M8 and the initialization transistor M5 to be turned on. Thus, the bias adjustment signal DVH is written into the first and second electrodes of the drive transistor M1, thereby reducing display brightness differences caused by the different potentials at the first and second electrodes of drive transistors M1 in different pixels 10 due to writing data signals Vdata in the write stage Ta4. In addition, the initialization signal Vref2 can be transmitted to the first electrode of the light-emitting element D again through the initialization transistor M5 so that the first electrode of the light-emitting element D is initialized thereby making preparations for the light emission stage Tb10.

In the light emission stage Tb10 of the refresh frame, the light emission control signal Emit may be at an active level so that the light emission control signal Emit can control the first light emission control transistor M6 and the second light emission control transistor M7 to be turned on. Thus, a conductive path is formed between the positive power supply signal PVDD and the negative power supply signal PVEE. The drive transistor M1 generates the drive current according to the gate voltage of the drive transistor M1. This drive current is transmitted to the light-emitting element D through the second light emission control transistor M7 to drive the light-emitting element D to emit light.

After the light emission stage Tb10 of the refresh frame, the non-light emission stage Ta20 of a holding frame is entered. In this case, the light emission control signal Emit returns to the inactive level, causing the light-emitting element D to stop emitting light. In the non-light emission stage Ta20 of the holding frame, the scanning signal SN1, the scanning signal SN2, and the scanning signal SP all remain at inactive levels so that the data write transistor M2, the reset transistor M4, and the compensation transistor M3 constantly remain in the off state. A signal at the gate of the drive transistor M1 is continuously the signal written during the refresh frame. In the fourth bias adjustment stage Ta6 of the non-light emission stage Ta20 of the holding frame, the scanning signal SP* once again controls the bias adjustment transistor M8 and the initialization transistor M5 to be on. Thus, a threshold drift caused by the drive transistor M1 being in the bias state for a long duration in the light emission stage of the refresh frame or a previous holding frame can be reduced so that preparations are made for the light emission stage Tb20 of a current holding frame.

After the light emission stage Ta20 of the holding frame is entered, the light emission control signal Emit returns to the active level. Thus, the drive current generated by the drive transistor M1 can be provided for the light-emitting element D, thereby driving the light-emitting element D to emit light.

In this manner, within the display period of the frame during which the display panel has the relatively low display refresh rate, the non-light emission duration of the pixel 10 and the light emission duration of the pixel 10 alternate. Thus, the pixel 10 can present the corresponding display and light emission brightness, thereby controlling the display brightness of the image displayed on the display panel.

It is to be noted that the preceding description of the structure and driving process of the pixel 10 is only exemplary. The structure and driving process of the pixel 10 are not specifically limited in the embodiment of the present disclosure. On the premise that the core inventive points in the embodiment of the present disclosure can be achieved, all modified technical solutions based on the structure and driving process of the pixel 10 provided in the embodiment of the present disclosure are within the scope of the embodiment of the present disclosure and are not further described herein.

With continued reference to FIGS. 2 and 3, when the brightness adjustment mode of the display panel is the DC mode, the ratio of the light emission duration of the pixel 10 to the non-light emission duration of the pixel 10 within a display period of each frame can be controlled to be a fixed value. In this case, the light emission stage may include both the light emission duration and the non-light emission duration or may include only the light emission duration. The voltage of the data signal Vdata written into the drive transistor M1 by the write transistor M2 in the write stage Ta4 of the non-light emission stage Ta10 of the refresh frame is controlled and drive currents provided for the light-emitting element D in the light emission stage Tb10 of the refresh frame and the light emission stage Tb20 of the holding frame are controlled so that the brightness of the light-emitting element D is controlled. Thus, the display and light emission brightness of the image displayed by the display panel 100 can be controlled. When the brightness adjustment mode of the display panel is the PWM mode, the relationship between the grayscale of the pixel 10 and the voltage of the data signal Vdata may be a fixed relationship. That is, in different brightness modes, the data signal Vdata corresponding to the same grayscale may have the same voltage. The conduction time of the first light emission control transistor M6 and the conduction time of the second light emission control transistor M7 in the light emission stage are controlled through the light emission control signal Emit so that the time during which the drive current generated by the drive transistor M1 is provided for the light-emitting element D can be controlled and the integral amount of the brightness of the light-emitting unit D over time is controlled. Thus, the overall brightness of the light-emitting unit D within the display period of the frame is controlled. That is, the light emission stage may include the light emission duration and the non-light emission duration, and the ratio of the light emission duration in the light emission stage to the display period of the frame is controlled so that the display brightness of the image displayed by the display panel can be controlled.

It is to be noted that the preceding description of the two brightness adjustment modes of the display panel is only exemplary. The display panel may also include other brightness adjustment modes, which may be designed according to actual requirements and is not specifically limited in the embodiment of the present disclosure. For ease of description, unless special limitations are made, the technical solutions in the embodiments of the present disclosure are illustrated using an example in which the brightness adjustment modes of the display panel include the DC mode and the PWM mode in the embodiments of the present disclosure.

It is to be understood that a specific brightness adjustment mode of the display panel may be selected according to the actual requirements, which is not specifically limited in the embodiment of the present disclosure. Exemplarily, if the brightness adjustment modes of the display panel include the DC mode and the PWM mode, the display panel may operate in the DC mode when changing within a relatively high display brightness range. However, when changing within a relatively low display brightness range, the display panel may operate in the PWM mode. In this manner, when the ratio of the light emission duration in the light emission stage to the display period of one frame is used as a display and light emission duty cycle of one frame, a display and light emission duty cycle of one frame in the DC mode may be greater than or equal to a display and light emission duty cycle of each frame in the PWM mode. Thus, the retention duration of the active level of the light emission control signal Emit in the DC mode is longer than or equal to the retention duration of the active level of the light emission control signal Emit in the PWM mode. That is, when the brightness adjustment mode of the display panel is the DC mode, the light emission control signal Emit controls the first light emission control transistor M6 and the second light emission control transistor M7 to continuously remain conductive for a relatively long duration so that the drive transistor M1 provides the drive current for the light-emitting element D according to the positive power supply signal at the first electrode of the drive transistor M1 and the signal at the gate of the drive transistor M1 for a relatively long duration; however, in the PWM mode, the light emission control signal Emit each time controls the first light emission control transistor M6 and the second light emission control transistor M7 to continuously remain on for a relatively short duration so that the drive transistor M1 provides the drive current for the light-emitting element D according to the positive power supply signal at the first electrode of the drive transistor M1 and the signal at the gate of the drive transistor M1 for a relatively short duration.

However, when the drive transistor M1 generates a certain drive current, a voltage difference exists between the positive power supply signal at the first electrode of the drive transistor M1 and the signal at the gate of the drive transistor M1. Therefore, the existence of the voltage difference causes the drive transistor M1 to be in the bias state. When the drive transistor M1 remains in the bias state for a relatively long duration, the threshold voltage Vth of the drive transistor M1 may drift. As a result, the drive transistor M1 fails to accurately generate the drive current, thereby influencing the display and light emission brightness of the light-emitting element D. In this manner, when the display panel needs to switch the brightness adjustment mode, for example, the display panel needs to switch from the DC mode to the PWM mode or from the PWM mode to the DC mode, the timing of providing the positive power signal PVDD for the first electrode of the drive transistor M1 may change, which in turn causes a change in a bias condition of the drive transistor M1. In addition, the drive transistor M1 has a relatively large bias difference, resulting in a relatively large difference between the threshold voltage drifts of the drive transistor M1 at the first frame and the second frame after the brightness adjustment mode is switched. As a result, when the drive transistor M1 generates the drive current to drive the light-emitting element D to perform a display and emit light, a relatively large difference exists in the display and light emission brightness of the light-emitting element D, which results in a relatively large display brightness difference between the two frames and a screen flicker appearing in the display panel. Thus, the display effect of the display panel is influenced.

Figure 4:
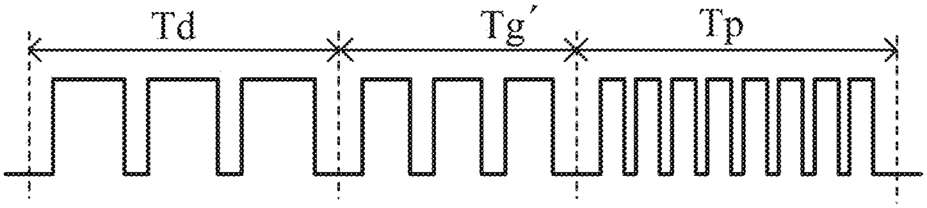
FIG. 4 is a drive timing graph of a display panel in the related art.
Figure 5:
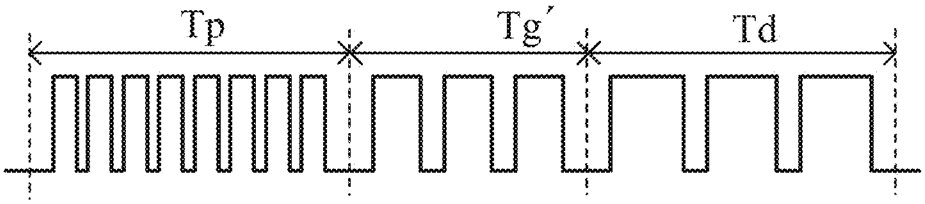
FIG. 5 is a drive timing graph of another display panel in the related art.

At present, when the brightness adjustment mode of the display panel is changed, for example, the brightness adjustment mode of the display panel is switched from the DC mode to the PWM mode as shown in FIG. 4 or the brightness adjustment mode of the display panel is switched from the PWM mode to the DC mode as shown in FIG. 5, a transition display frame is inserted. The transition display frame may have a relatively short display period. That is, the transition display frame may have a relatively high display refresh rate. Additionally, a display and light emission duty cycle of the transition display frame may be between a display and light emission duty cycle before the brightness adjustment mode is switched and a display and light emission duty cycle after the brightness adjustment mode is switched.

Exemplarily, as shown in FIG. 4, when the brightness adjustment mode of the display panel is switched from the DC mode to the PWM mode, a transition display frame Tg' may be inserted between the last frame Td in the DC mode and the first frame Tp in the PWM mode if a display refresh rate of the last frame Td in the DC mode is Fd, a display and light emission duty cycle of the last frame Td in the DC mode is a, a display refresh rate of the first frame Tp in the PWM mode is Fp, and a display and light emission duty cycle of the first frame Tp in the PWM mode is b. In addition, a display refresh rate of the transition display frame Tg' may be Fg', and a display and light emission duty cycle of the transition display frame Tg' may be c'. In this case, Fg' may be higher than or equal to both Fd and Fp, and c' may be less than a and greater than b. In this case, bias time of the drive transistor in the pixel in the transition display frame Tg' may be between bias time of the drive transistor in the pixel in the last frame Td in the DC mode and bias time of the drive transistor in the pixel in the first frame Tp in the PWM mode. Thus, the bias condition of the drive transistor in the pixel in the transition display frame Tg' may be between the bias condition of the drive transistor in the pixel in the last frame Td in the DC mode and the bias condition of the drive transistor in the pixel in the first frame Tp in the PWM mode. Accordingly, the display and light emission brightness of the transition display frame Tg' can be between the display and light emission brightness of the last frame Td in the DC mode and the display and light emission brightness of the first frame Tp in the PWM mode as shown in FIG. 4 (or a similar condition occurs as shown in FIG. 5), thereby improving the screen flicker caused by an abrupt change in the brightness adjustment mode.

However, the display refresh rate Fg' and display and light emission duty cycle c' of the transition display frame Tg' are each different from the display refresh rate Fp and display and light emission duty cycle b of the first frame Tp in the PWM mode and the display refresh rate Fd and display and light emission duty cycle a of the last frame Td in the DC mode. Therefore, when the last frame Td in the DC mode is switched to the transition display frame Tg', compared with the last frame Td in the DC mode, the transition display frame Tg' has a simultaneously changing display refresh rate Fg', resulting in a relatively significant change in the bias condition of the drive transistor in the pixel. In addition, when the transition display frame Tg' is switched to the first frame Tp in the PWM mode, compared with the transition display frame Tg', the first frame Tp in the PWM mode has a changing display refresh rate Fp and a changing display and light emission duty cycle b, also resulting in a relatively significant change in the bias condition of the drive transistor in the pixel. As a result, the bias condition of the drive transistor during a display period of the first frame Tp in the PWM mode is different from the bias condition of the drive transistor during a display period of the second frame in the PWM mode, causing the difference between the display and light emission brightness of the first frame Tp in the PWM mode and the display and light emission brightness of the second frame in the PWM mode. Accordingly, the display panel still has a relatively high probability of a screen flicker, thereby influencing the display effect of the display panel.

Figure 6:
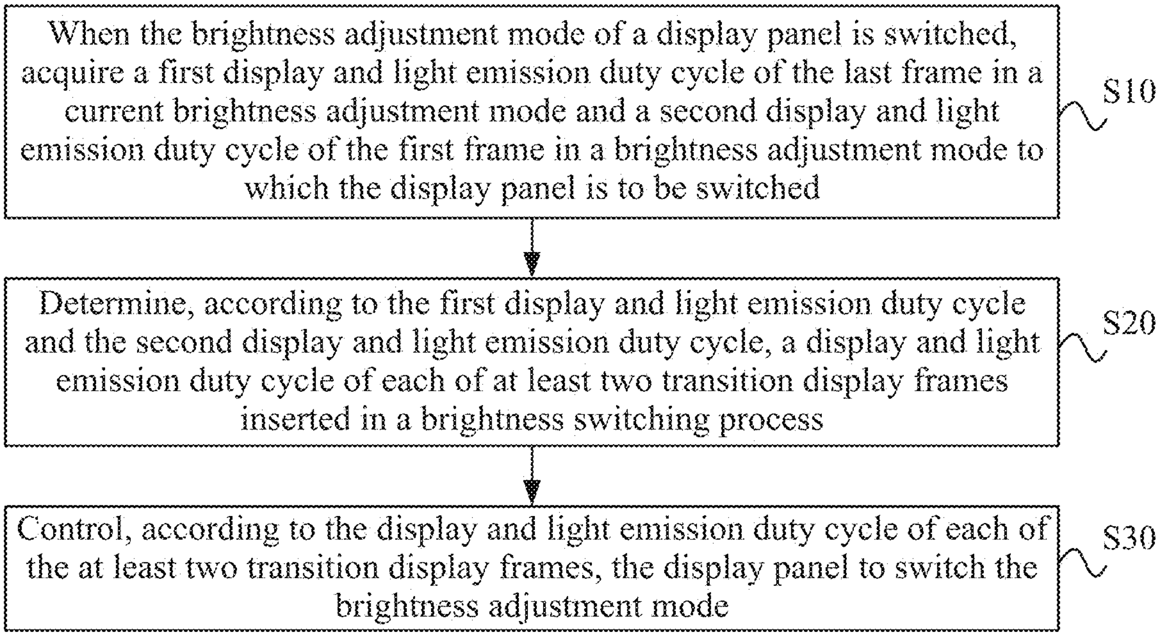
FIG. 6 is a flowchart of a display control method for a display panel according to an embodiment of the present disclosure.

To solve the preceding technical problem, an embodiment of the present disclosure provides a display control method for a display panel. With the display control method for the display panel, the screen flicker of the display panel can be improved. With the display control method for the display panel in the embodiment of the present disclosure, a display panel provided in an embodiment of the present disclosure can be controlled to display an image. A display control device for the display panel provided in the embodiment of the present disclosure may perform the display control method for the display panel. The display control device for the display panel may be implemented with software and/or hardware and may be integrated into a driver chip configured to drive the display panel. FIG. 6 is a flowchart of the display control method for the display panel according to the embodiment of the present disclosure. As shown in FIG. 6, the method includes the steps below.

In S10, when the brightness adjustment mode of the display panel is switched, a first display and light emission duty cycle of the last frame in a current brightness adjustment mode and a second display and light emission duty cycle of the first frame in a brightness adjustment mode to which the display panel is to be switched are acquired.

For example, the brightness adjustment mode of the display panel includes the DC mode and the PWM mode. Switching the brightness adjustment mode of the display panel may be understood as switching from the DC mode to the PWM mode or switching from the PWM mode to the DC mode. If the current brightness adjustment mode is the DC mode, the brightness adjustment mode to which the display panel is to be switched is the PWM mode, or if the current brightness adjustment mode is the PWM mode, the brightness adjustment mode to which the display panel is to be switched is the DC mode.

A display and light emission duty cycle may refer to the percentage of the time during which the light-emitting element of a pixel in the display panel is controlled to perform a display and emit light within a display period of one frame to the display period of the frame. Typically, the correspondence between the grayscale of each frame and the voltage of a data signal or the display and light emission duty cycle may be set according to the actual requirements. For example, when the brightness of the environment where the display panel is located varies within a relatively high brightness range, the display panel may operate in the DC mode. The display panel may have a relatively high display and light emission duty cycle when displaying an image. The display and light emission brightness of the display panel may be controlled through the control of the voltage of a data signal written into each pixel. If the brightness of the environment where the display panel is located varies within a relatively low brightness range, the display panel may operate in the PWM mode. The display panel may control a display and light emission duty cycle of each frame of the display panel according to the brightness of the environment where the display panel is located.

When the brightness mode of the display panel needs to be switched, a display and light emission duty cycle of the image displayed by the display panel correspondingly varies. In this case, a display and light emission duty cycle of the last frame in the current brightness adjustment mode may be acquired and used as the first display and light emission duty cycle, and a display and light emission duty cycle of the first frame in the brightness adjustment mode to which the display panel is to be switched may be acquired and used as the second display and light emission duty cycle.

In S20, a display and light emission duty cycle of each of at least two transition display frames inserted in a brightness switching process is determined according to the first display and light emission duty cycle and the second display and light emission duty cycle.

The at least two transition display frames include at least one of a first transition display frame or a second transition display frame. A display and light emission duty cycle of the first transition display frame is equal to the first display and light emission duty cycle. A display and light emission duty cycle of the second transition display frame is equal to the second display and light emission duty cycle. A display refresh rate of each transition display frame of the at least two transition display frames is higher than or equal to a current display refresh rate of the display panel.

It is to be understood that the brightness switching process refers to the process where the last frame in the current brightness adjustment mode is switched to the first frame in the brightness adjustment mode to which the display panel is to be switched. In the brightness switching process, the at least two transition display frames may be included. That is, two or more transition display frames may be inserted between the last frame in the current brightness adjustment mode and the first frame in the brightness adjustment mode to which the display panel is to be switched. The number of transition display frames may be specifically designed according to the actual requirements and is not specifically limited in the embodiment of the present disclosure.

In addition, the at least two transition display frames include the at least one of the first transition display frame or the second transition display frame. That is, the at least two transition display frames may include only the first transition display frame, the at least two transition display frames may include only the second transition display frame, the at least two transition display frames may include both the first second transition display frame and the second transition display frame, or the at least two transition display frames may also include another transition display frame on the premise that the at least two transition display frames include the at least one of the first transition display frame or the second transition display frame. The transition display frames included by the at least two transition display frames may be specifically designed according to the actual requirements and are not specifically limited in the embodiment of the present disclosure.

Specifically, when the at least two transition display frames include the first transition display frame, since the display and light emission duty cycle of the first transition display frame is equal to the first display and light emission duty cycle, the first transition display frame may be between the last frame in the current brightness adjustment mode and another transition display frame so that the last frame in the current brightness adjustment mode can be directly switched to the first transition display frame. In addition, the display and light emission duty cycle of the last frame in the current brightness adjustment mode and the display and light emission duty cycle of the first transition display frame are each the first display and light emission duty cycle. Thus, when the last frame in the current brightness adjustment mode is switched to the first transition display frame and when the first transition display frame is switched to another transition display frame or the first frame in the brightness adjustment mode to which the display panel is switched, threshold voltage drifts of the drive transistor in the pixel caused by the display and light emission duty cycles can remain consistent, and the difference between the threshold voltage drifts of the drive transistor during the displays of different frames is reduced. Thus, the display brightness difference between the different frames can be reduced, and this helps to mitigate the significant brightness fluctuations that occur when switching display images, which are caused by simultaneous variations in both the display and light emission duty cycle and the display refresh rate. As a result, the problem of screen flickering in the display panel is alleviated and the display effect of the display panel can be enhanced.

Similarly, when the at least two transition display frames include the second transition display frame, since the display and light emission duty cycle of the second transition display frame is equal to the second display and light emission duty cycle, the second transition display frame may be between another transition display frame and the first frame in the brightness adjustment mode to which the display panel is to be switched so that the second transition display frame can be directly switched to the first frame in the brightness adjustment mode to which the display panel is to be switched. In addition, the display and light emission duty cycle of the second transition display frame and the display and light emission duty cycle of the first frame in the brightness adjustment mode to which the display panel is to be switched are each the second display and light emission duty cycle. Thus, when the second transition display frame is switched to the first frame in the brightness adjustment mode to which the display panel is to be switched and when the first frame in the brightness adjustment mode to which the display panel is to be switched is switched to the second frame in the brightness adjustment mode to which the display panel is to be switched, the amount of the threshold voltage drift of the drive transistor in the pixel can have a relatively small difference. Thus, the display brightness difference between the different frames can be reduced, and the problem is alleviated that simultaneous variations in both the display and light emission duty cycle and the display refresh rate lead to a relatively significant abrupt brightness variation during the switchover of the display image, resulting in the screen flicker of the display panel. Furthermore, the display effect of the display panel can be enhanced.

It is to be noted that when the at least two transition display frames include the first transition display frame, the display and light emission duty cycle of the first transition display frame is equal to the first display and light emission duty cycle of the last frame in the current brightness adjustment mode. In this case, the brightness adjustment mode in which the display panel displays the first transition display frame may be the same as or different from the current brightness adjustment mode. In an optional embodiment, when the brightness adjustment mode in which the display panel displays the first transition display frame is the same as the current brightness adjustment mode, the brightness adjustment mode of the display panel may not need to be changed during the switchover from the last frame in the current brightness adjustment mode to the first transition display frame. That is, a drive mode for the pixels in the display panel does not need to be changed, thereby facilitating the simplification of the drive mode during the switchover of the image and reducing the drive cost of the display panel.

Accordingly, when the at least two transition display frames include the second transition display frame, the display and light emission duty cycle of the second transition display frame is equal to the second display and light emission duty cycle of the first frame in the brightness adjustment mode to which the display panel is to be switched. In this case, the brightness adjustment mode in which the display panel displays the second transition display frame may be the same as or different from the brightness adjustment mode to which the display panel is to be switched. In an optional embodiment, when the brightness adjustment mode in which the display panel displays the second transition display frame is the same as the brightness adjustment mode to which the display panel is to be switched, the brightness adjustment mode of the display panel may not need to be changed during the switchover from the second transition display frame to the first frame in the brightness adjustment mode to which the display panel is to be switched. That is, a drive mode for the pixels in the display panel does not need to be changed, thereby facilitating the simplification of the drive mode during the switchover of the image and reducing the drive cost of the display panel.

In addition, the display refresh rate of the display panel refers to the number of frames displayed per unit time. The higher the display refresh rate of the display panel, the more frames are displayed per unit time, the shorter the display period of each frame, the shorter the interval for writing the data signal to the drive transistor in the pixel, and the smaller the threshold voltage drift of the drive transistor in the pixel. In this manner, the display refresh rate of the transition display frame is set to be higher than or equal to the current display refresh rate of the display panel so that a display period of the transition display frame is shorter than or equal to a display period of a current frame. The transition display frame has a relatively short display period so that the amount of the threshold voltage drift of the drive transistor in the transition display frame can be reduced. Accordingly, during the switchover from the transition display frame to the first frame in the brightness adjustment mode to which the display panel is to be switched, the display and light emission accuracy of the light-emitting element of each pixel in the first frame can be improved, thereby improving the display quality of the display panel.

It is also to be understood that the at least two transition display frames may refer to two transition display frames, three transition display frames, or more than three transition display frames, which may be specifically designed according to the actual requirements and is not specifically limited in the embodiment of the present disclosure. The display refresh rate of each transition display frame may be the same or different. For example, when the at least two transition display frames include both the first transition display frame and the second transition display frame, the display refresh rate of the first transition display frame may be the same as or different from the display refresh rate of the second transition display frame, which is not specifically limited in the embodiment of the present disclosure on the premise that the display refresh rate of each transition display frame is higher than the current display refresh rate.

In an optional embodiment, when the maximum display refresh rate of each transition display frame is denoted by F0, and the current refresh rate of the display panel is denoted by F1, N transition display frames may be inserted in the brightness switching process, where N≤F0/F1, and N is a positive integer.

It is to be understood that a display period of the transition display frame with the maximum refresh rate among the at least two transition display frames may be T0/F0, and a display period of one frame at the current refresh rate of the display panel is T0/F1, where T0 is unit time. Thus, the ratio of the display period of one frame at the current refresh rate to the display period of the transition display frame with the maximum refresh rate is F0/F1. That is, F0/F1 transition display frames with the maximum refresh rate may be displayed within the time during which one frame is displayed at the current refresh rate.

Specifically, when the N transition display frames are inserted in the brightness switching process, that is, the N transition display frames are provided for the switchover between the last frame in the current brightness adjustment mode and the first frame in the brightness adjustment mode to which the display panel is to be switched, the total display period of all the transition display frames between the last frame in the current brightness adjustment mode and the first frame in the brightness adjustment mode to which the display panel is to be switched may be longer than or equal to N×T0/F0. If the total display period is relatively long, it takes a relatively long duration to switch from the last frame in the current brightness adjustment mode to the first frame in the brightness adjustment mode to which the display panel is to be switched, thereby influencing the display effect of the display panel. N is set to be the positive integer less than or equal to F0/F1 so that the total display period of all the transition display frames can be shorter than or equal to (F0/F1)×(T0/F0) or the difference between the total display period of all the transition display frames and (F0/F1)×(T0/F0) is relatively small. That is, the total display period of all the transition display frames can be shorter than or equal to the time during which one frame is displayed at the current display refresh rate or the difference between the total display period of all the transition display frames and the time during which one frame is displayed at the current display refresh rate is relatively small. Thus, the image displayed in each of the transition display frames is prevented from being perceptible to human eyes due to the relatively long total display period of all the transition display frames, thereby facilitating the enhancement of the overall display effect of the display panel.

In S30, the display panel is controlled to switch the brightness adjustment mode according to the display and light emission duty cycle of each of the at least two transition display frames.

Specifically, after the display of the last frame in the current brightness adjustment mode is completed, the display panel may be controlled to sequentially display all the transition display frames. After the displays of all the transition display frames are completed, the display panel may be controlled to display the first frame in the brightness adjustment mode to which the display panel is to be switched, thereby switching the brightness adjustment mode of the display panel. The content displayed in each transition display frame may be the same as the content displayed in the last frame in the current brightness adjustment mode or the content displayed in the first frame in the brightness adjustment mode to which the display panel is to be switched.

In an optional embodiment, the operation in which the display panel is controlled to switch the brightness adjustment mode according to the display and light emission duty cycle of each of the at least two transition display frames includes the following: if a current image of the display panel is the last frame in the current brightness adjustment mode, the display panel is controlled to sequentially display images in the at least two transition display frames after the display panel displays the current image; and the display panel is controlled to display the first frame in the brightness mode to which the display panel is to be switched after the display panel completes the display of each of the images in the at least two transition display frames.

Figure 7:
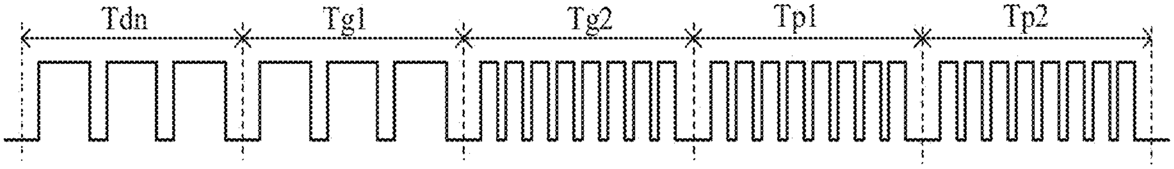
FIGS. 7 to 26 are drive timing graphs of a display panel according to an embodiment of the present disclosure.

In an example embodiment, for example, the at least two transition display frames include one first transition display frame and one second transition display frame. As shown in FIG. 7, if the current brightness adjustment mode is the DC mode, the brightness adjustment mode to which the display panel is to be switched is the PWM mode, and the current display refresh rate of the display panel is F1, it may be determined according to a first display and light emission duty cycle A of the last frame Tdn in the DC mode that a display and light emission duty cycle Tdn of a first transition display frame Tg1 is A and a display refresh rate of the first transition display frame Tg1 is higher than F1. In addition, it may be determined according to a second display and light emission duty cycle B of the first frame Tp1 in the PWM mode that a display and light emission duty cycle of a second transition display frame Tg2 is B and a display refresh rate of the second transition display frame Tg2 is higher than F1. In this manner, after the display period of the last frame Tdn in the DC mode is entered, data signals may be written into the gates of drive transistors in the pixels in a one-to-one correspondence. In addition, after the completion of writing the data signals into the pixels, signals at the gates of the drive transistors remain constant so that when controlling, in a one-to-one correspondence, the pixels to perform a display and emit light adopting the first display and light emission duty cycle, the drive transistors may provide drive currents for light-emitting elements according to the signals at the gates of the drive transistors to drive the light-emitting elements to emit light. Thus, it is ensured that a corresponding image can be accurately displayed in the last frame Tdn in the DC mode. At the end moment of the display period of the last frame Tdn in the DC mode, a bias condition of the drive transistor in each pixel is related to display and light emission duration of the pixel in the last frame Tdn in the DC mode. After the display of the last frame Tdn in the DC mode is completed, a display period of the first transition display frame Tg1 is entered. At this time, the data signals may be provided for the pixels again in a one-to-one correspondence. Accordingly, signals at the gate, first electrode, and second electrode of the drive transistor in each pixel can have relatively small differences so that the bias state of the drive transistor in the pixel can be adjusted. Moreover, after the completion of writing the data signals into the pixels, a light emission stage of the pixels is entered and the light-emitting element of each pixel can perform a display and emit light at the first display and light emission duty cycle. At the end moment of the display period of the first transition display frame Tg1, a bias condition of the drive transistor in each pixel is related to display and light emission duration of the pixel in the first transition display frame Tg1. After the display of an image in the first transition display frame Tg1 is completed, a display period of the second transition display frame Tg2 is entered. At this time, the data signals may be provided for the pixels again in a one-to-one correspondence, and the pixels are controlled to perform a display and emit light adopting the second display and light emission duty cycle. At the end moment of the display period of the second transition display frame Tg2, a bias condition of the drive transistor in each pixel is related to display and light emission duration of the pixel in the second transition display frame Tg2. By analogy, after the display of an image in the second transition display frame Tg2 is completed, the first frame Tp1 in the PWM mode, the second frame Tp2 in the PWM mode, and so on, are sequentially entered.

Since the display and light emission duty cycle of the first transition display frame Tg1 is the same as the first display and light emission duty cycle of the last frame Tdn in the DC mode, the bias conditions of the drive transistor in each pixel can have a relatively small difference within the display period of the last frame Tdn in the DC mode and the display period of the first transition display frame Tg1. Thus, the display brightness difference between the last frame Tdn in the DC mode and the first transition display frame Tg1 caused by a bias difference of the drive transistor is reduced. Furthermore, a smooth transition from the last frame Tdn in the DC mode to the first transition display frame Tg1 can be implemented. The display refresh rate of the first transition display frame Tg1 and the display refresh rate of the second transition display frame Tg2 are each higher than the current display refresh rate so that the display refresh rate of the first transition display frame Tg1 is equal to or approximates to the display refresh rate of the second transition display frame Tg2. Thus, within the display period of the first transition display frame Tg1 and the display period of the second transition display frame Tg2, the bias conditions of the drive transistor in each pixel can have a relatively small difference. Accordingly, the display brightness difference between the first transition display frame Tg1 and the second transition display frame Tg2 caused by a bias difference of the drive transistor is reduced. Furthermore, a smooth transition from the first transition display frame Tg1 to the second transition display frame Tg2 can be implemented. Similarly, the display and light emission duty cycle of the second transition display frame Tg2 is equal to the display and light emission duty cycle of the first frame Tp1 in the PWM mode. Thus, the second transition display frame Tg2 and the first frame Tp1 in the PWM mode can have a relatively small display brightness difference, and the first frame Tp1 in the PWM mode and the second frame Tp2 in the PWM mode can also have a relatively small brightness difference. Furthermore, a smooth transition from the second transition display frame Tg2 to the first frame Tp1 in the PWM mode and a smooth transition from the first frame Tp1 in the PWM mode to the second frame Tp2 in the PWM mode can be implemented. In this manner, the at least two transition display frames are inserted in the brightness switching process so that the screen flicker caused by a relatively large display brightness difference between two adjacent frames can be improved, thereby enhancing the display effect of the display panel.

Figure 8:
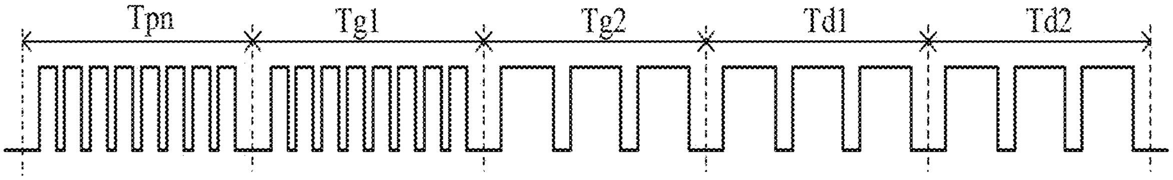

In another example embodiment, for example, the at least two transition display frames still include one first transition display frame and one second transition display frame. As shown in FIG. 8, if the current brightness adjustment mode is the PWM mode and the brightness adjustment mode to which the display panel is to be switched is the DC mode, the first transition display frame Tg1 and the second transition display frame Tg2 are sequentially displayed in the process where the last frame Tpn in the PWM mode is switched to the first frame Td1 in the DC mode. In this case, the screen flicker caused by a relatively large display brightness difference between two adjacent frames can also be improved. The specific principle is similar to the preceding principle of the switchover from the DC mode to the PWM mode. For the similarities, reference may be made to the preceding description. The details are not repeated here.

It is to be noted that FIGS. 7 and 8 only show the examples in which the at least two transition display frames include the first transition display frame and the second transition display frame for exemplary description. However, in the embodiment of the present disclosure, the at least two transition display frames may include only the first transition display frame. In this case, at least the screen flicker caused during the switchover from the current brightness adjustment mode to the first transition display frame can be improved. Alternatively, the at least two transition display frames may include only the second transition display frame. In this case, at least the screen flicker caused during the switchover from the second transition display frame to the first frame in the brightness adjustment mode to which the display panel is to be switched and the screen flicker caused during the switchover from the first frame in the brightness adjustment mode to which the display panel is to be switched to the second frame in the brightness adjustment mode to which the display panel is to be switched can be improved. Alternatively, the at least two transition display frames may include a third transition display frame with a display and light emission duty cycle different from the first display and light emission duty cycle and the second display and light emission duty cycle. The transition display frames included by the at least two transition display frames may be specifically designed according to the actual requirements and are not specifically limited in the embodiment of the present disclosure.

Optionally, the operation in which the display and light emission duty cycle of each of the at least two transition display frames inserted in the brightness switching process is determined according to the first display and light emission duty cycle and the second display and light emission duty cycle includes the following: when the current display refresh rate is lower than a preset refresh rate, the at least two transition display frames inserted in the brightness switching process are divided into at least a first transition frame group and a second transition frame group after the first transition frame group.

A transition display frame in the first transition frame group is the first transition display frame and a transition display frame in the second transition frame group is the second transition display frame. A display refresh rate of each of a first transition display frame and a second transition display frame which are adjacent to each other is a set refresh rate. The set refresh rate is higher than or equal to the preset refresh rate.

Specifically, the transition display frame in the first transition frame group is the first transition display frame so that a display and light emission duty cycle of each transition display frame in the first transition frame group is the first display and light emission duty cycle. That is, the display and light emission duty cycle of the last frame in the current brightness adjustment mode is the same as the display and light emission duty cycle of each transition display frame in the first transition frame group so that the last frame in the current brightness adjustment mode and each transition display frame in the first transition frame group can have a relatively small display brightness difference. Thus, a smooth transition from the last frame in the current brightness adjustment mode to the first transition display frame in the first transition frame group can be implemented. In addition, the transition display frame in the second transition frame group is the second transition display frame so that a display and light emission duty cycle of each transition display frame in the second transition frame group is the second display and light emission duty cycle. That is, the display and light emission duty cycle of the first frame in the brightness adjustment mode to which the display panel is to be switched is the same as the display and light emission duty cycle of each transition display frame in the second transition frame group so that the first frame in the brightness adjustment mode to which the display panel is to be switched and each transition display frame in the second transition frame group can have a relatively small display brightness difference. Thus, a smooth transition from the second transition display frame in the second transition frame group to the first frame in the brightness adjustment mode to which the display panel is to be switched can be implemented. In addition, the display refresh rate of each of the first transition display frame and the second transition display frame which are adjacent to each other is the set refresh rate. That is, the first transition display frame and the second transition display frame which are adjacent to each other have the same display refresh rate so that the first transition display frame and the second transition display frame which are adjacent to each other have the same display period. Thus, the first transition display frame and the second transition display frame can have a relatively small display brightness difference. Accordingly, a smooth transition from the first transition display frame to the second transition display frame can be implemented. In this manner, the smooth transition from the last frame in the current brightness adjustment mode to the first transition display frame in the first transition frame group is first implemented, then the smooth transition from the first transition display frame to the second transition display frame is implemented, and finally, the smooth transition from the second transition display frame in the second transition frame group to the first frame in the brightness adjustment mode to which the display panel is to be switched is implemented. Thus, the screen flicker caused by relatively large display brightness differences between frames in the brightness switching process can be improved and the display uniformity of the frames is enhanced, thereby enhancing the display effect of the display panel.

The set refresh rate may be a relatively high display refresh rate so that when the display refresh rate of a transition display frame is the set refresh rate, the transition display frame can have a relatively short display period. The influence of the relatively long display period of the transition display frame on the overall display content of the display panel is prevented, thereby facilitating the improvement of the display quality of the display panel. Exemplarily, when the maximum display refresh rate of the display panel is 120 Hz, the preset refresh rate may be 60 Hz, and the set refresh rate may be higher than or equal to 60 Hz and lower than or equal to 120 Hz.

When the current display refresh rate of the display panel is lower than the preset refresh rate, the current refresh rate of the display panel may be considered as a relatively low refresh rate, resulting in a relatively long display period of the last frame in the current brightness adjustment mode of the display panel and a relatively long display period of the first frame in the brightness adjustment mode to which the display panel is to be switched. As a result, variations occur both in the display period and display and light emission duty cycle of one frame, causing a relatively significant display brightness variation. Therefore, the first transition frame group and the second transition frame group are inserted between the last frame in the current brightness adjustment mode and the first frame in the brightness adjustment mode to which the display panel is to be switched so that only one of the display period or the display and light emission duty cycle is varied during each image switchover. Thus, the smooth transition from the last frame in the current brightness adjustment mode to the first frame in the brightness adjustment mode to which the display panel is to be switched can be ensured, thereby improving the screen flicker during the brightness mode switchover of the display panel and enhancing the display effect of the display panel.

It is to be understood that when the at least two transition display frames inserted in the brightness switching process are divided into at least the first transition frame group and the second transition frame group after the first transition frame group, the first transition frame group may include one or more first transition display frames, and the second transition frame group may include one or more second transition display frames. The number of first transition display frames in the first transition frame group and the number of second transition display frames in the second transition frame group may be specifically designed according to the actual requirements and are not specifically limited in the embodiment of the present disclosure. In addition, the number of first transition display frames in the first transition frame group may be the same as or different from the number of second transition display frames in the second transition frame group, which is not specifically limited in the embodiment of the present disclosure.

In an optional embodiment, when the difference between the current display refresh rate and the set refresh rate is larger than a preset rate difference, the first transition frame group includes at least two first transition display frames. Two adjacent first transition display frames are the first first transition display frame and the second first transition display frame after the first first transition display frame, respectively. A display refresh rate of the first first transition display frame is higher than the current display refresh rate. A display refresh rate of the second first transition display frame is higher than the display refresh rate of the first first transition display frame.

It is to be understood that the first transition frame group includes the at least two first transition display frames. That is, the first transition frame group may include two, three, or more first transition display frames. The number of first transition display frames in the first transition frame group may be specifically designed according to the actual requirements and is not specifically limited in the embodiment of the present disclosure. In addition, when the two adjacent first transition display frames are the first first transition display frame and the second first transition display frame, respectively, the second first transition display frame is after the first first transition display frame such that after the display of an image in the first first transition display frame is completed, the display of an image in the second first transition display frame is performed. Moreover, the display refresh rate of the second first transition display frame is higher than the display refresh rate of the first first transition display frame. That is, the first transition display frames between the last frame in the current brightness adjustment mode and the second transition display frame may have gradually increasing display refresh rates so that a gradual transition from the current display refresh rate to the set refresh rate can be implemented.

Figure 9:
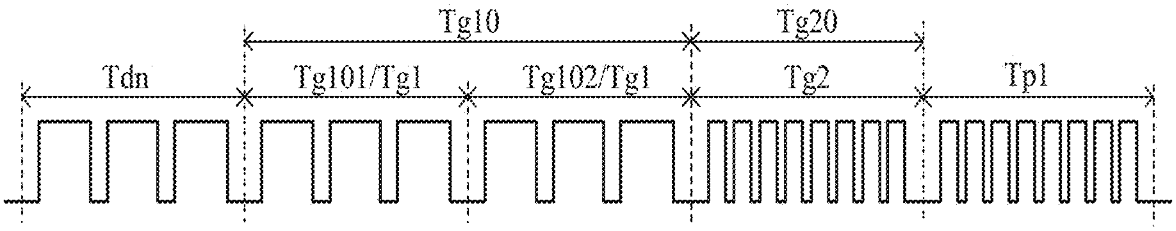

Specifically, as shown in FIG. 9 (or FIG. 10), for example, a first transition frame group Tg10 includes two first transition display frames Tg1, that is, the first first transition display frame Tg101 and the second first transition display frame Tg102. When the current display refresh rate is lower than the preset refresh rate, the current display refresh rate may be determined as the relatively low refresh rate. However, the set refresh rate is typically a relatively high refresh rate. As a result, a certain difference exists between a display refresh rate (that is, the set refresh rate) of the second first transition display frame Tg102 and a display refresh rate of the last frame Tdn (or TPn) in the current brightness adjustment mode. When this difference is relatively large, the display period of the last frame Tdn (or TPn) in the current brightness adjustment mode and the display period of the second first transition display frame Tg102 whose display refresh rate is the set refresh rate have a relatively large difference. The existence of this time difference causes a certain display brightness difference between the last frame Tdn (or TPn) in the current brightness adjustment mode and the second first transition display frame Tg102 whose display refresh rate is the set refresh rate. In this case, the first first transition display frame Tg101 whose display refresh rate is between the set refresh rate and the current display refresh rate may be inserted between the last frame Tdn (or TPn) in the current brightness adjustment mode and the second first transition display frame Tg102 whose display refresh rate is the set refresh rate. In this manner, the display period of the last frame Tdn (or TPn) in the current brightness adjustment mode and the display period of the first first transition display frame Tg101 have a relatively small difference so that the display brightness difference between the last frame Tdn (or TPn) in the current brightness adjustment mode and the first first transition display frame Tg101 caused by the difference in the display period is reduced. In addition, the display period of the first first transition display frame Tg101 and the display period of the second first transition display frame Tg102 also have a relatively small difference so that the first first transition display frame Tg101 and the second first transition display frame Tg102 have a relatively small display brightness difference. Thus, a smooth transition from the last frame Tdn (or TPn) in the current brightness adjustment mode to the second first transition display frame Tg102 can be implemented, thereby improving the screen flicker and enhancing the display effect of the display panel.

Figure 10:
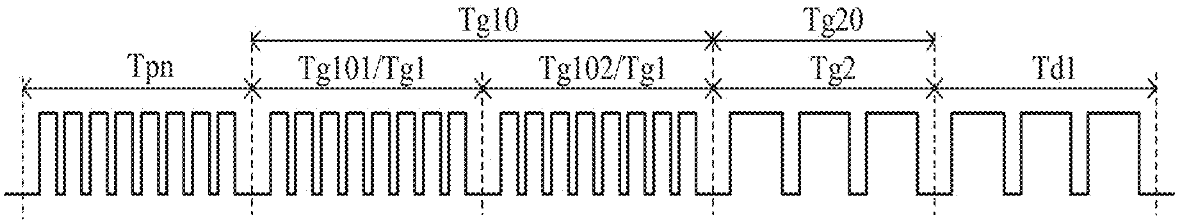
Figure 11:
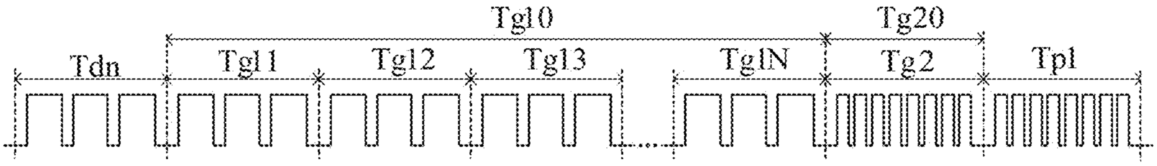
Figure 12:
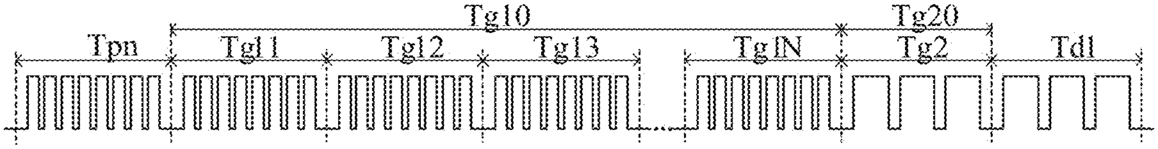

It is to be noted that FIGS. 9 and 10 only show the examples in which the first transition frame group includes the two first transition display frames for exemplary description. The number of first transition frames in the first transition frame group is not specifically limited in the embodiment of the present disclosure. In an example embodiment, as shown in FIG. 11 or FIG. 12, the first transition frame group may include N first transition display frames (Tg11, Tg12, Tg13, . . . , Tg1N), where N may be a positive integer greater than or equal to 3. In this case, a display refresh rate of the first transition display frame Tg12 may be higher than a display refresh rate of the first transition display frame Tg11, and a display refresh rate of the first transition display frame Tg13 may be higher than a display refresh rate of the first transition display frame Tg12. By analogy, a display refresh rate of the first transition display frame Tg1N may be higher than a display refresh rate of each of the other first transition display frames so that a smooth transition from the last frame Tdn (or TPn) in the current brightness adjustment mode to the first transition display frame Tg1N is implemented.

It is also to be noted that when the first transition frame group includes three or more first transition display frames, the difference between display refresh rates of any two adjacent first transition display frames may be either a fixed value or a non-fixed value, which may be specifically designed according to the actual requirements and is not specifically limited in the embodiment of the present disclosure. In an optional embodiment, the increase in a display refresh rate of each first transition display frame may gradually increase so that the number of provided first transition display frames is reduced on the premise that a smooth transition of each frame is ensured. In another optional embodiment, the difference between the display refresh rates of any two adjacent first transition display frames is equal to the difference between display refresh rates of any other two adjacent first transition display frames so that the drive mode of the display panel can be simplified.

Optionally, with reference to FIG. 9 or FIG. 10, a first rate difference is the difference between the display refresh rate of the first first transition display frame Tg101 and the current display refresh rate, and a second rate difference is the difference between the display refresh rate of the second first transition display frame Tg102 and the display refresh rate of the first first transition display frame Tg101. The first rate difference and the second rate difference are each within a preset rate difference range.

It is to be understood that the preset rate difference range may be a relatively small value range. When the difference between display refresh rates of two adjacent frames is within this preset rate difference range, the display brightness difference caused by the difference between the display refresh rates is relatively small. For example, this display brightness difference is not easily perceived by human eyes. In an example embodiment, the upper limit of the preset rate difference range may be lower than or equal to 60 Hz, and the lower limit of the preset rate difference range may be higher than 0 Hz.

Specifically, referring to FIG. 9 (or FIG. 10), the display refresh rate of the last frame Tdn (or Tpn) in the current brightness adjustment mode is the current display refresh rate. The first rate difference between the display refresh rate of the first first transition display frame Tg101 and the current display refresh rate is set to be within the preset rate difference range so that the display brightness difference between the first first transition display frame Tg101 and the last frame Tdn (or Tpn) in the current brightness adjustment mode caused by the difference between the display refresh rates is relatively small. Thus, during the switchover from the last frame Tdn (or Tpn) in the current brightness adjustment mode to the first first transition display frame Tg101, the display brightness variation between the two frames can be reduced. In addition, the second rate difference between the display refresh rate of the second first transition display frame Tg102 and the display refresh rate of the first first transition display frame Tg101 is set to be within the preset rate difference range so that the display brightness difference between the second first transition display frame Tg102 and the first first transition display frame Tg101 caused by the difference between the refresh rates can be relatively small. Thus, during the switchover from the first first transition display frame Tg101 to the second first transition display frame Tg102, the display brightness variation between the two frames can be reduced. In this manner, the rate difference between the display refresh rates of the two adjacent frames is set to be within the preset rate difference range so that the two adjacent frames can have the relatively small display brightness difference. Accordingly, the screen flicker can be improved and the display effect of the display panel can be enhanced.

In another optional embodiment, when the difference between the current display refresh rate and the set refresh rate is larger than the preset rate difference, the second transition frame group includes at least two second transition display frames. Two adjacent second transition display frames are the first second transition display frame and the second second transition display frame, respectively. A display refresh rate of the first second transition display frame is higher than a display refresh rate of the second second transition display frame. The display refresh rate of the second second transition display frame is higher than the current display refresh rate.

It is to be understood that the second transition frame group includes the at least two second transition display frames. That is, the second transition frame group may include two, three, or more second transition display frames. The number of second transition display frames in the second transition frame group may be specifically designed according to the actual requirements and is not specifically limited in the embodiment of the present disclosure. In addition, when the two adjacent second transition display frames are the first second transition display frame and the second second transition display frame, respectively, the second second transition display frame is after the first second transition display frame such that after the display of an image in the first second transition display frame is completed, the display of an image in the second second transition display frame is performed. Moreover, the display refresh rate of the second second transition display frame is higher than the display refresh rate of the first second transition display frame. That is, the second transition display frames between the first transition display frame and the first frame in the brightness adjustment mode to which the display panel is to be switched may have gradually increasing display refresh rates so that a gradual transition from the set refresh rate to the current display refresh rate can be implemented.

Figure 13:
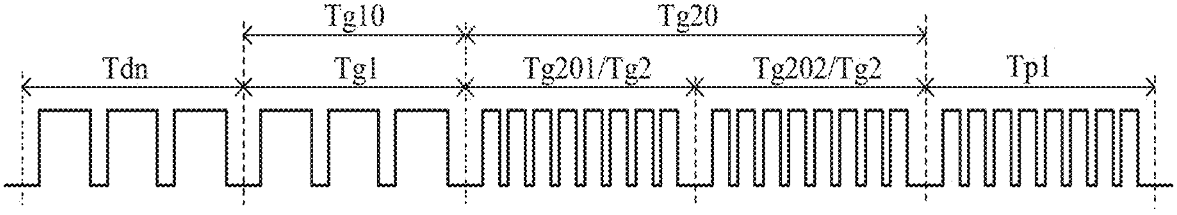

Specifically, as shown in FIG. 13 (or FIG. 14), for example, a second transition frame group Tg20 includes two second transition display frames Tg2, that is, the first second transition display frame Tg201 and the second second transition display frame Tg202. When the current display refresh rate is a lower refresh rate than the preset refresh rate, a relatively large difference exists between a display refresh rate (that is, the set refresh rate) of the first second transition display frame Tg201 and a display refresh rate of the first frame Tp1 (or Td1) in the brightness adjustment mode to which the display panel is to be switched. As a result, the display period of the first frame Tp1 (or Td1) in the brightness adjustment mode to which the display panel is to be switched and the display period of the first second transition display frame Tg201 whose display refresh rate is the set refresh rate have a relatively large difference. The existence of this time difference causes a certain display brightness difference between the first frame Tp1 (or Td1) in the brightness adjustment mode to which the display panel is to be switched and the first second transition display frame Tg201 whose display refresh rate is the set refresh rate. In this case, the second second transition display frame Tg202 whose display refresh rate is between the set refresh rate and the current display refresh rate may be inserted between the first second transition display frame Tg201 whose display refresh rate is the set refresh rate and the first frame Tp1 (or Td1) in the brightness adjustment mode to which the display panel is to be switched. In this manner, the display period of the first second transition display frame Tg201 and the display period of the second second transition display frame Tg202 have a relatively small difference so that the display brightness difference between the first second transition display frame Tg201 and the second second transition display frame Tg202 caused by the difference in the display period is reduced. In addition, the display period of the second second transition display frame Tg202 and the display period of the first frame Tp1 (or Td1) in the brightness adjustment mode to which the display panel is to be switched also have a relatively small difference so that the second second transition display frame Tg202 and the first frame Tp1 (or Td1) in the brightness adjustment mode to which the display panel is to be switched have a relatively small display brightness difference. Thus, a smooth transition from the first second transition display frame Tg201 to the first frame Tp1 (or Td1) in the brightness adjustment mode to which the display panel is to be switched can be implemented, thereby improving the screen flicker and enhancing the display effect of the display panel.

Figure 14:
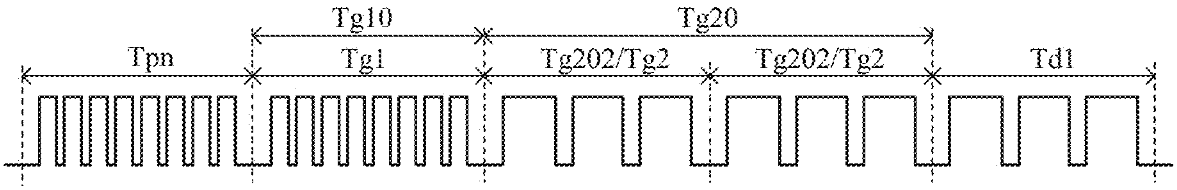
Figure 15:
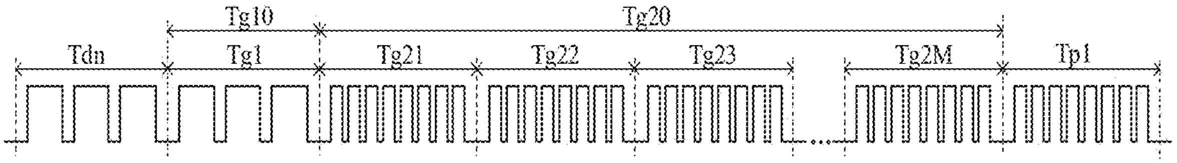
Figure 16:
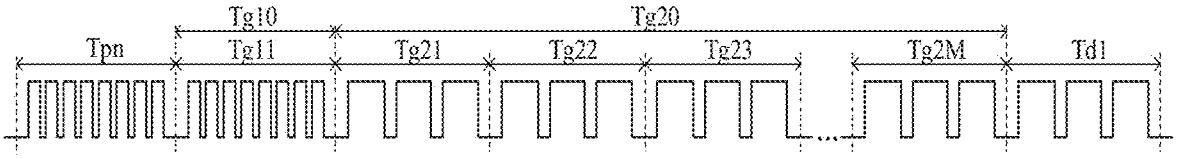

It is to be noted that FIGS. 13 and 14 only show the examples in which the second transition frame group includes the two second transition display frames for exemplary description. The number of second transition frames in the second transition frame group is not specifically limited in the embodiment of the present disclosure. In an example embodiment, as shown in FIG. 15 or FIG. 16, the second transition frame group may include M second transition display frames (Tg21, Tg22, Tg23, . . . , Tg2M), where M may be a positive integer greater than or equal to 3. In this case, a display refresh rate of the second transition display frame Tg22 may be higher than a display refresh rate of the second transition display frame Tg21, and a display refresh rate of the second transition display frame Tg23 may be higher than a display refresh rate of the second transition display frame Tg22. By analogy, a display refresh rate of the second transition display frame Tg2M may be higher than a display refresh rate of each of the other second transition display frames so that a smooth transition from the second transition display frame Tg21 to the first frame Tp1 (or Td1) in the brightness adjustment mode to which the display panel is to be switched is implemented.

It is also to be noted that when the second transition frame group includes three or more second transition display frames, the difference between display refresh rates of any two adjacent second transition display frames may be either a fixed value or a non-fixed value, which may be specifically designed according to the actual requirements and is not specifically limited in the embodiment of the present disclosure. In an optional embodiment, the increase in a display refresh rate of each second transition display frame may gradually increase so that the number of provided second transition display frames is reduced on the premise that a smooth transition of each frame is ensured. In another optional embodiment, the difference between the display refresh rates of any two adjacent second transition display frames is equal to the difference between display refresh rates of any other two adjacent second transition display frames so that the drive mode of the display panel can be simplified.

Optionally, with reference to FIG. 13 or FIG. 14, the difference between the display refresh rate of the first second transition display frame Tg201 and the display refresh rate of the second second transition display frame Tg202 is a third rate difference, and the difference between the display refresh rate of the second second transition display frame Tg202 and the current display refresh rate is a fourth rate difference. The third rate difference and the fourth rate difference are each within the preset rate difference range.

Specifically, the display refresh rate of the first frame Tp1 (or Td1) in the brightness adjustment mode to which the display panel is to be switched is the current display refresh rate. The third rate difference between the display refresh rate of the first second transition display frame Tg201 and the display refresh rate of the second second transition display frame Tg202 is set to be within the preset rate difference range so that the display brightness difference between the first second transition display frame Tg201 and the second second transition display frame Tg202 caused by the difference between the display refresh rates is relatively small. Thus, during the switchover from the first second transition display frame Tg201 to the second second transition display frame Tg202, the display brightness variation between the two frames can be reduced. In addition, the fourth rate difference between the display refresh rate of the second second transition display frame Tg202 and the display refresh rate of the first frame Tp1 (or Td1) in the brightness adjustment mode to which the display panel is to be switched is set to be within the preset rate difference range so that the display brightness difference between the second second transition display frame Tg202 and the first frame Tp1 (or Td1) in the brightness adjustment mode to which the display panel is to be switched caused by the difference between the display refresh rates is relatively small. Thus, during the switchover from the second second transition display frame Tg202 to the first frame Tp1 (or Td1) in the brightness adjustment mode to which the display panel is to be switched, the display brightness variation between the two frames can be reduced. In this manner, the rate difference between the display refresh rates of the two adjacent frames is set to be within the preset rate difference range so that the two adjacent frames can have the relatively small display brightness difference. Accordingly, the screen flicker can be improved and the display effect of the display panel can be enhanced.

Figure 17:
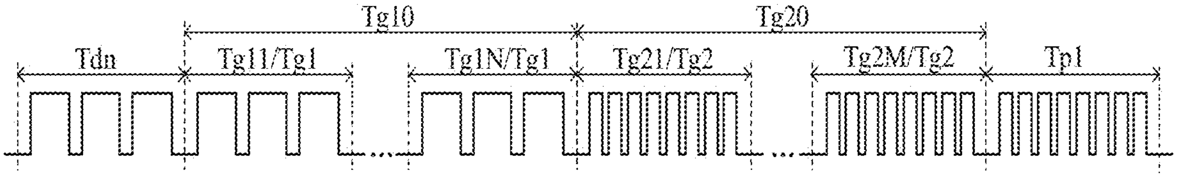
Figure 18:
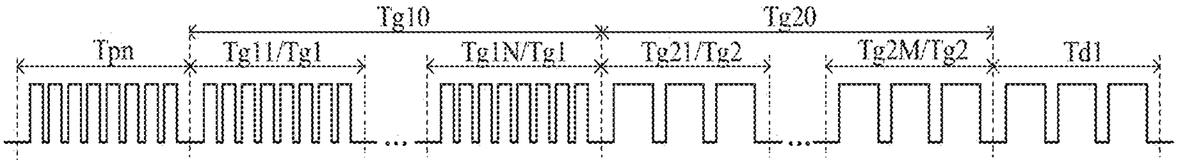

It is to be noted that an exemplary description is performed above using the example in which the first transition frame group includes multiple first transition display frames and the second transition frame group includes one second transition display frame or the first transition frame group includes one first transition display frame and the second transition frame group includes multiple second transition display frames. However, in the embodiment of the present disclosure, as shown in FIG. 17 or FIG. 18, the first transition frame group Tg10 may include N first transition display frames Tg1, and the second transition frame group Tg20 may include M second transition display frames Tg2. Both M and N are positive integers greater than or equal to 2, and M and N may be the same as or different from each other, which may be specifically designed according to the actual requirements and is not specifically limited in the embodiment of the present disclosure.

In addition, an exemplary description is performed above using the example in which the at least two transition display frames between the last frame in the current brightness adjustment mode and the first frame in the brightness adjustment mode to which the display panel is to be switched include at least one first transition display frame and at least one second transition display frame. However, in the embodiment of the present disclosure, another transition display frame may also be provided between the first transition display frame and the second transition display frame, which may be specifically designed according to the actual requirements and is not specifically limited in the embodiment of the present disclosure.

For ease of description, unless special limitations are made, in the embodiment of the present disclosure, the technical solution in the embodiment of the present disclosure is exemplarily described using the example in which the first transition frame group includes the N first transition display frames and the second transition frame group includes the M second transition display frames.

Optionally, when the difference between the first display and light emission duty cycle and the second display and light emission duty cycle is larger than a preset duty cycle difference, the at least two transition display frames further include at least one third transition display frame between the first transition display frame and the second transition display frame. A display and light emission duty cycle of each of the at least one third transition display frame is between the first display and light emission duty cycle and the second display and light emission duty cycle. A display refresh rate of each of the at least one third transition display frame is the set refresh rate.

It is to be understood that the preset duty cycle difference may be a relatively large value. For example, the preset duty cycle difference may be larger than or equal to 30%. The preset duty cycle difference may be specifically designed according to the actual requirements and is not specifically limited in the embodiment of the present disclosure. When the difference between display and light emission duty cycles of two adjacent frames is larger than the preset duty cycle difference, the difference between the display and light emission duty cycles of the two adjacent frames is relatively large. The difference between the display and light emission duty cycles causes a relatively large display and light emission brightness difference. In this case, another display frame whose display and light emission duty cycle is between the display and light emission duty cycles of the two adjacent frames may be inserted between the two frames so that the display brightness of each frame can smoothly transition, thereby enhancing the display uniformity of the display panel.

Figure 19:
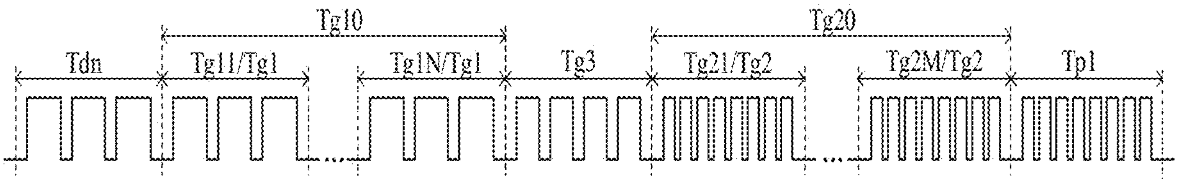
Figure 20:
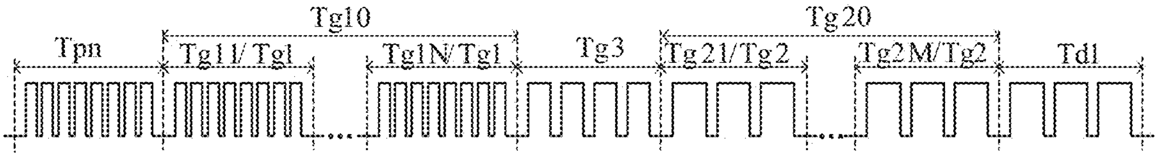

Specifically, referring to FIG. 19 or FIG. 20, a display and light emission duty cycle of each first transition display frame Tg1 in the first transition frame group Tg10 is the first display and light emission duty cycle, and a display and light emission duty cycle of each second transition display frame Tg2 in the second transition frame group Tg20 is the second display and light emission duty cycle. Therefore, a certain difference exists between the display and light emission duty cycle of the first transition display frame Tg1 in the first transition frame group Tg10 and the display and light emission duty cycle of the second transition display frame Tg2 in the second transition frame group Tg20. When this difference is larger than the preset duty cycle difference, a relatively large display brightness difference between the two frames is caused by the relatively large difference between the display and light emission duty cycles of the two frames if the last first transition display frame Tg1N in the first transition frame group Tg10 is directly switched to the first second transition display frame Tg21 in the second transition frame group Tg20. In this case, a third transition display frame Tg3 is inserted between the last first transition display frame Tg1N in the first transition frame group Tg10 and the first second transition display frame Tg21 in the second transition frame group Tg20. In addition, a display and light emission duty cycle of the third transition display frame Tg3 is between the first display and light emission duty cycle and the second display and light emission duty cycle. Moreover, a display refresh rate of the third transition display frame Tg3, a display refresh rate of the last first transition display frame Tg1N in the first transition frame group Tg10, and a display refresh rate of the first second transition display frame Tg21 in the second transition frame group Tg20 are each the set refresh rate. Thus, the display and light emission duty cycle of the last first transition display frame Tg1N in the first transition frame group Tg10 and the display and light emission duty cycle of the third transition display frame Tg3 have a relatively small difference, and the display and light emission duty cycle of the third transition display frame Tg3 and the display and light emission duty cycle of the first second transition display frame Tg21 in the second transition frame group Tg20 have a relatively small difference. Thus, the display brightness difference between the last first transition display frame Tg1N in the first transition frame group Tg10 and the third transition display frame Tg3 caused by the display and light emission duty cycles is reduced, and the display brightness difference between the third transition display frame Tg3 and the first second transition display frame Tg21 in the second transition frame group Tg20 caused by the display and light emission duty cycles is reduced. Accordingly, a smooth transition from the last first transition display frame Tg1N in the first transition frame group Tg10 to the first second transition display frame Tg21 in the second transition frame group Tg20 can be implemented, thereby improving the screen flicker and enhancing the display effect of the display panel.

It is to be noted that FIG. 19 and FIG. 20 only show the examples in which one third transition display frame is inserted between the first transition frame group and the second transition frame group for exemplary description. However, in the embodiment of the present disclosure, the number of third transition display frames inserted between the first transition frame group and the second transition frame group may be designed according to the actual requirements and is not specifically limited in the embodiment of the present disclosure.

Figure 21:
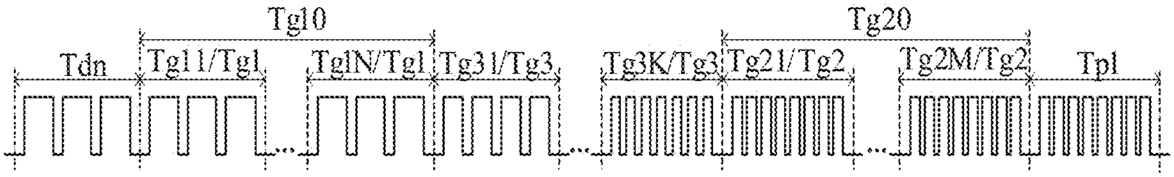
Figure 22:
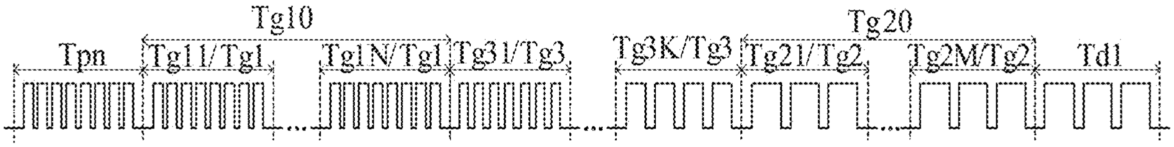

In an example embodiment, as shown in FIG. 21 or FIG. 22, K third transition display frames Tg3 (Tg31, . . . , Tg3K) may be provided between the first transition frame group Tg10 and the second transition frame group Tg20, where K is any positive integer. In this case, a display and light emission duty cycle of each third transition display frame Tg3 may be between the first display and light emission duty cycle and the second display and light emission duty cycle. In addition, for two adjacent third transition display frames Tg3, when the absolute value of the difference between a display and light emission duty cycle of the previous third transition display frame Tg3 and the first display and light emission duty cycle is a first duty cycle, and the difference between a display and light emission duty cycle of the subsequent third transition display frame Tg3 and the first display and light emission duty cycle is a second duty cycle, the first duty cycle may be less than the second duty cycle. Thus, a display and light emission duty cycle of the third transition display frame Tg3 adjacent to the first transition display frame Tg1 and the first display and light emission duty cycle have a relatively small difference. Accordingly, it can be ensured that when the adjacent first transition display frame Tg1 is switched to the third transition display frame Tg3, a brightness variation can be relatively small. Similarly, for two adjacent third transition display frames Tg3, when the absolute value of the difference between the display and light emission duty cycle of the previous third transition display frame Tg3 and the second display and light emission duty cycle is a third duty cycle, and the difference between the display and light emission duty cycle of the subsequent third transition display frame Tg3 and the second display and light emission duty cycle is a fourth duty cycle, the fourth duty cycle may be less than the third duty cycle. Thus, a display and light emission duty cycle of the third transition display frame Tg3 adjacent to the second transition display frame Tg2 and the second display and light emission duty cycle have a relatively small difference. Accordingly, it can be ensured that when the adjacent third transition display frame Tg3 is switched to the second transition display frame Tg2, a brightness variation can be relatively small.

In an optional embodiment, ΔDuty1 denotes the difference between display and light emission duty cycles of a first transition display frame and a third transition display frame which are adjacent to each other, and ΔDuty2 denotes the difference between display and light emission duty cycles of a third transition display frame and a second transition display frame which are adjacent to each other. ΔDuty1 and ΔDuty2 are each within a preset duty cycle difference range.

The preset duty cycle difference range may be understood as a relatively small difference range. For example, the upper limit of the preset duty cycle difference range may be less than or equal to 30%, and the lower limit of the preset duty cycle difference range may be greater than or equal to −30%. The upper and lower limits of the preset duty cycle difference range may be specifically designed according to the actual requirements and are not specifically limited in the embodiment of the present disclosure. It is to be understood that when the difference between display and light emission duty cycles of two adjacent frames is within the preset duty cycle difference range, a display brightness difference caused by the difference between the display and light emission duty cycles of the two frames is relatively small.

Specifically, referring to FIG. 21 or FIG. 22, the first third transition display frame Tg31 among the third transition display frames Tg3 is adjacent to the first transition display frame Tg1. In this case, the difference ΔDuty1 between a display and light emission duty cycle of the first third transition display frame Tg31 and the display and light emission duty cycle of the first transition display frame Tg1 may be within the preset duty cycle difference range. Thus, the display and light emission duty cycle of the first third transition display frame Tg31 and the display and light emission duty cycle of the first transition display frame Tg1 have the relatively small difference. Accordingly, a brightness difference caused by the difference between the display and light emission duty cycle of the first third transition display frame Tg31 and the display and light emission duty cycle of the first transition display frame Tg1 is relatively small. Thus, the display panel can have a relatively small display brightness variation when switching from the first transition display frame Tg1 to the first third transition display frame Tg31. Similarly, the last third transition display frame Tg3K among the third transition display frames Tg3 is adjacent to the second transition display frame Tg2. In this case, the difference ΔDuty2 between a display and light emission duty cycle of the last third transition display frame Tg3K and the display and light emission duty cycle of the second transition display frame Tg2 may be within the preset duty cycle difference range. Thus, the display and light emission duty cycle of the last third transition display frame Tg3K and the display and light emission duty cycle of the second transition display frame Tg2 have the relatively small difference. Accordingly, a brightness difference caused by the difference between the display and light emission duty cycle of the last third transition display frame Tg3K and the display and light emission duty cycle of the second transition display frame Tg2 is relatively small. Thus, the display panel can have a relatively small display brightness variation when switching from the last third transition display frame Tg3K to the second transition display frame Tg2.

In addition, when multiple third transition display frames Tg3 are provided between the first transition frame group Tg10 and the second transition frame group Tg20, the difference ΔDuty3 between display and light emission duty cycles of two adjacent third transition display frames Tg3 may also be within the preset duty cycle difference range. Thus, when switching between the two adjacent third transition display frames Tg3, the display panel can also have a relatively small variation in the display brightness of the display image, thereby improving the screen flicker of the display panel and enhancing the display effect of the display panel. ΔDuty1, ΔDuty2, and ΔDuty3 may have a same value, or ΔDuty1, ΔDuty2, and ΔDuty3 may be different from each other, which may be specifically designed according to the actual requirements and is not specifically limited in the embodiment of the present disclosure.

It is to be understood that when the multiple third transition display frames Tg3 are provided between the first transition frame group Tg10 and the second transition frame group Tg20, the brightness adjustment mode of the third transition display frame (Tg31) adjacent to the first transition display frame Tg1 may be the same as the brightness adjustment mode of the first transition display frame Tg1, and/or, the brightness adjustment mode of the third transition display frame Tg3K adjacent to the second transition display frame Tg2 may be the same as the brightness adjustment mode of the second transition display frame Tg2 so that the drive mode of the display panel can be simplified and the brightness adjustment mode between the transition display frames does not need to be repeatedly switched.

In an optional embodiment, the brightness adjustment mode of at least part of the third transition display frames Tg3 is the brightness adjustment mode to which the display panel is to be switched.

In an example embodiment, as shown in FIG. 21, when the brightness adjustment mode to which the display panel is to be switched is the PWM mode, the brightness adjustment mode of at least part of the third transition display frames Tg3 may also be set as the PWM mode. Thus, the third transition display frames Tg3 can have the same correspondence between the voltage of the data signal and the grayscale. When the display panel is driven to display an image, only the display and light emission duty cycle of each third transition display frame Tg3 needs to be changed, thereby facilitating the simplification of the drive mode of the display panel.

In another example embodiment, as shown in FIG. 22, when the brightness adjustment mode to which the display panel is to be switched is the DC mode, the brightness adjustment mode of the at least part of the third transition display frames Tg3 may be set as the DC mode. Thus, when the display content of each of the third transition display frames Tg3 is the same as the display content in the brightness adjustment mode to which the display panel is to be switched, the data signals provided for the pixels during the display of an image in each of the third transition display frames Tg3 can remain consistent with the data signals provided for the pixels during the display of the first frame in the brightness adjustment mode to which the display panel is to be switched. Only light emission duration of each pixel needs to be adjusted so that the display and light emission duty cycle can be adjusted. Thus, the simplification of the drive mode of the display panel is also facilitated.

It is to be understood that in the embodiment of the present disclosure, the brightness adjustment mode of the at least part of the third transition display frames is the brightness adjustment mode to which the display panel is to be switched. That is, the brightness adjustment mode of all the third transition display frames may be set as the brightness adjustment mode to which the display panel is to be switched or only the brightness adjustment mode of those third transition display frames adjacent to the second transition display frame may be set as the brightness adjustment mode to which the display panel is to be switched. The specific configuration may be designed according to the actual requirements and is not specifically limited in the embodiment of the present disclosure.

It is to be noted that the technical solution in the embodiment of the present disclosure is only exemplarily described above using the example in which the current display refresh rate of the display panel is relatively low. However, when the current display refresh rate of the display panel is relatively high, a brightness switching process may be the same as or different from the preceding process, which may be specifically designed according to the actual requirements and is not specifically limited in the embodiment of the present disclosure.

Optionally, the operation in which the display and light emission duty cycle of each of the at least two transition display frames inserted in the brightness switching process is determined according to the first display and light emission duty cycle and the second display and light emission duty cycle further includes the following: when the current display refresh rate is higher than or equal to the preset refresh rate, two transition display frames inserted in the brightness switching process are determined. The two transition display frames are the first transition display frame and a fourth transition display frame after the first transition display frame, respectively. Each of the display refresh rate of the first transition display frame and a display refresh rate of the fourth transition display frame is the set refresh rate, and the set refresh rate is higher than the current display refresh rate. A display and light emission duty cycle of the fourth transition display frame is between the display and light emission duty cycle of the first transition display frame and the second display and light emission duty cycle.

It is to be understood that when the current display refresh rate is higher than or equal to the preset refresh rate, the current display refresh rate may be determined as a relatively high display refresh rate. The current display refresh rate is caused to be the same as or approximate to the display refresh rate of the transition display frame. Thus, during the switchover from the last frame in the current brightness adjustment mode to the transition display frame or the switchover from the transition display frame to the first frame in the brightness adjustment mode to which the display panel is to be switched, a display brightness variation caused by the difference between the display refresh rates is relatively small.

Figure 23:
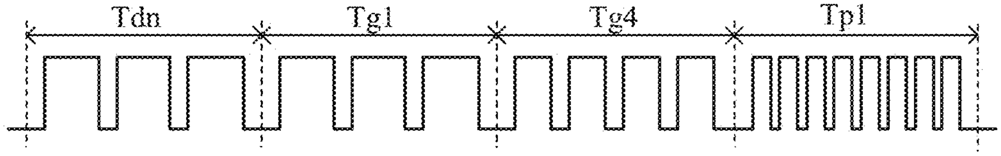

As shown in FIG. 23 (or FIG. 24), the at least two transition display frames inserted between the last frame Tdn (or Tpn) in the current brightness adjustment mode and the first frame Td1 (or Tp1) in the brightness adjustment mode to which the display panel is to be switched may include the first transition display frame Tg1 and a fourth transition display frame Tg4. The display and light emission duty cycle of the first transition display frame Tg1 and the display and light emission duty cycle of the last frame Tdn (or Tpn) in the current brightness adjustment mode are each the first display and light emission duty cycle. Moreover, the display refresh rate of the first transition display frame Tg1 and the display refresh rate of the last frame Tdn (or Tpn) in the current brightness adjustment mode are each higher than the preset refresh rate. Thus, during the switchover from the last frame Tdn (or Tpn) in the current brightness adjustment mode to the first transition display frame Tg1, a display brightness variation can be relatively small. In addition, the display refresh rate of the first transition display frame Tg1 and a display refresh rate of the fourth transition display frame Tg4 may be each the set refresh rate. The display refresh rate of the fourth transition display frame Tg4 and the display refresh rate of the first frame Tp1 (or Td1) in the brightness adjustment mode to which the display panel is to be switched may be each higher than the preset refresh rate. In addition, a display and light emission duty cycle of the fourth transition display frame Tg4 is between the first display and light emission duty cycle and the second display and light emission duty cycle. Thus, the display and light emission duty cycle of the fourth transition display frame Tg4 and the display and light emission duty cycle of the first transition display frame Tg1 have a relatively small difference, and the display and light emission duty cycle of the fourth transition display frame Tg4 and the display and light emission duty cycle of the first frame Tp1 (or Td1) in the brightness adjustment mode to which the display panel is to be switched also have a relatively small difference. Accordingly, the first transition display frame Tg1 and the fourth transition display frame Tg4 have a relatively small display brightness difference, and the fourth transition display frame Tg4 and the first frame Tp1 (or Td1) in the brightness adjustment mode to which the display panel is to be switched have a relatively small display brightness difference. Thus, a smooth transition from the first transition display frame Tg1 to the fourth transition display frame Tg4 can be implemented, and a smooth transition from the fourth transition display frame Tg4 to the first frame Tp1 (or Td1) in the brightness adjustment mode to which the display panel is to be switched. Furthermore, the screen flicker can be improved and the display uniformity of the display panel is enhanced, thereby improving the display effect of the display panel.

In addition, the two transition display frames, that is, the first transition display frame Tg1 and the fourth transition display frame Tg4, are inserted between the last frame Tdn (or Tpn) in the current brightness adjustment mode and the first frame Tp1 (or Td1) in the brightness adjustment mode to which the display panel is to be switched. The transition display frames have a relatively short display period. Thus, a quick switchover from the last frame Tdn (or Tpn) in the current brightness adjustment mode to the first frame Tp1 (or Td1) in the brightness adjustment mode to which the display panel is to be switched can be implemented, thereby facilitating the enhancement of the display effect of the display panel.

Optionally, the brightness adjustment mode of the first transition display frame Tg1 is the current brightness adjustment mode, and the brightness adjustment mode of the fourth transition display frame Tg4 is the brightness adjustment mode to which the display panel is to be switched.

Figure 24:
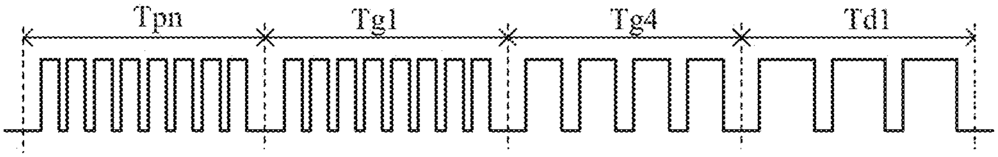

Specifically, with continued reference to FIG. 23 or FIG. 24, when the current brightness adjustment mode is the DC mode, the brightness adjustment mode of the first transition display frame Tg1 is also the DC mode, and when the current brightness adjustment mode is the PWM mode, the brightness adjustment mode of the first transition display frame Tg1 is also the PWM mode. In this manner, during the switchover from the last frame Tdn (or Tpn) in the current brightness adjustment mode to the image in the first transition display frame Tg1, the current brightness adjustment mode does not need to be switched. Thus, the drive mode of the display panel can be simplified. Correspondingly, when the brightness adjustment mode to which the display panel is to be switched is the PWM mode, the brightness adjustment mode of the fourth transition display frame Tg4 is also the PWM mode, and when the brightness adjustment mode to which the display panel is to be switched is the DC mode, the brightness adjustment mode of the fourth transition display frame Tg4 is also the DC mode. In this manner, during the switchover from the last frame Tp1 (or Td1) in the brightness adjustment mode to which the display panel is to be switched to an image in the fourth transition display frame Tg4, the current brightness adjustment mode does not need to be switched. Thus, the drive mode of the display panel can be simplified.

Optionally, when A denotes the first display and light emission duty cycle, B denotes the second display and light emission duty cycle, and C denotes the display and light emission duty cycle of the fourth transition display frame, the difference between |A−C| and |B−C| is within the preset duty cycle difference range.

The preset duty cycle difference range may be understood as a relatively small difference range. For example, the upper limit of the preset duty cycle difference range may be less than or equal to 30%, and the lower limit of the preset duty cycle difference range may be greater than or equal to 0. The upper and lower limits of the preset duty cycle difference range may be specifically designed according to the actual requirements and are not specifically limited in the embodiment of the present disclosure. It is to be understood that when the difference between display and light emission duty cycles of two adjacent frames is within the preset duty cycle difference range, a display brightness difference caused by the difference between the display and light emission duty cycles of the two frames is relatively small.

Specifically, with continued reference to FIG. 23 or FIG. 24, the display and light emission duty cycle of the first transition display frame Tg1 is the first display and light emission duty cycle A, the display and light emission duty cycle of the first frame Tp1 (or Td1) in the brightness adjustment mode to which the display panel is to be switched is the first display and light emission duty cycle B, and the display and light emission duty cycle of the fourth transition display frame Tg4 is the display and light emission duty cycle C. Therefore, the difference between the display and light emission duty cycle of the first transition display frame Tg1 and the display and light emission duty cycle of the fourth transition display frame Tg4 is A—C, and the difference between the display and light emission duty cycle of the first frame Tp1 (or Td1) in the brightness adjustment mode to which the display panel is to be switched and the display and light emission duty cycle of the fourth transition display frame Tg4 is B−C. In addition, when the difference between |A−C| and |B−C| is within the preset duty cycle difference range, the display brightness difference between the first transition display frame Tg1 and the fourth transition display frame Tg4 caused by the difference between the display and light emission duty cycles is relatively small, and the display brightness difference between the fourth transition display frame Tg4 and the first frame Tp1 (or Td1) in the brightness adjustment mode to which the display panel is to be switched is also relatively small. Thus, during the switchover from the first transition display frame Tg1 to the fourth transition display frame Tg4, a display brightness variation can be relatively small, and during the switchover from the fourth transition display frame Tg4 to the first frame Tp1 (or Td1) in the brightness adjustment mode to which the display panel is to be switched, a display brightness variation can also be relatively small. Furthermore, the improvement of the screen flicker is facilitated, and the display effect of the display panel is enhanced.

It is to be noted that the case is only exemplarily described above where the two transition display frames may be inserted in the brightness switching process when the current display refresh rate is higher than the preset refresh rate. However, in the embodiment of the present disclosure, the two transition display frames inserted in the brightness switching process are not limited to the preceding case, may be specifically designed according to the actual requirements, and are not specifically limited in the embodiment of the present disclosure.

Figure 25:
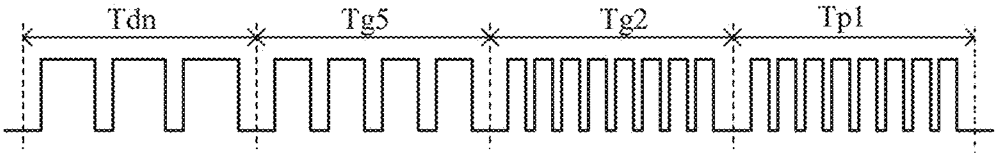
Figure 26:
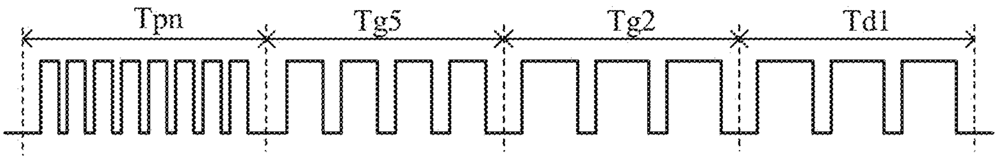

Exemplarily, as shown in FIG. 25 or FIG. 26, two transition display frames inserted in the brightness switching process may be a fifth transition display frame Tg5 and the second transition display frame Tg2. The display and light emission duty cycle of the fifth transition display frame Tg5 may be between the first display and light emission duty cycle and the second display and light emission duty cycle. The fifth transition display frame Tg5 may be between the last frame Tdn (or Tpn) in the current brightness switching mode and the second transition display frame Tg2. In this manner, the last frame Tdn (or Tpn) in the current brightness switching mode and the fifth transition display frame Tg5 have a relatively small display brightness difference, and the fifth transition display frame Tg5 and the second transition display frame Tg2 also have a relatively small display brightness difference. Thus, during the switchover from the last frame Tdn (or Tpn) in the current brightness switching mode to the fifth transition display frame Tg5, a display brightness variation can be relatively small, and during the switchover from the fifth transition display frame Tg5 to the second transition display frame Tg2, a display brightness variation can also be relatively small. Furthermore, the improvement of the screen flicker is facilitated, and the display effect of the display panel is enhanced.

Figure 27:
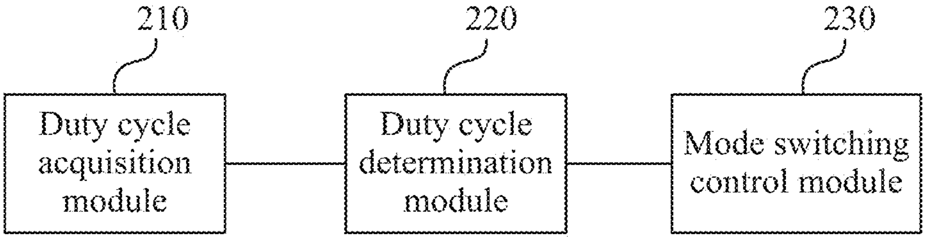
FIG. 27 is a block diagram of a display control device for a display panel according to an embodiment of the present disclosure.

Based on the same inventive concept, an embodiment of the present disclosure further provides a display control device for a display panel. The display control device for the display panel can improve a screen flicker of the display panel. The display control device for the display panel in the embodiment of the present disclosure can perform the display control method for the display panel provided in the embodiment of the present disclosure to control the display panel provided in the embodiment of the present disclosure to display an image. The display control device for the display panel may be implemented with software and/or hardware and may be integrated into the driver chip configured to drive the display panel. FIG. 27 is a block diagram of the display control device for the display panel according to the embodiment of the present disclosure. As shown in FIG. 27, the display control device for the display panel includes a duty cycle acquisition module 210, a duty cycle determination module 220, and a mode switching control module 230.

The duty cycle acquisition module 210 acquires a first display and light emission duty cycle of the last frame in a current brightness adjustment mode and a second display and light emission duty cycle of the first frame in a brightness adjustment mode to which the display panel is to be switched when a brightness adjustment mode of the display panel is switched.

The duty cycle determination module 220 determines, according to the first display and light emission duty cycle and the second display and light emission duty cycle, a display and light emission duty cycle of each of at least two transition display frames inserted in a brightness switching process. The at least two transition display frames include a first transition display frame and/or a second transition display frame. A display and light emission duty cycle of the first transition display frame is equal to the first display and light emission duty cycle. A display and light emission duty cycle of the second transition display frame is equal to the second display and light emission duty cycle.

The mode switching control module 230 is configured to control the display panel to switch the brightness adjustment mode according to the display and light emission duty cycle of each of the at least two transition display frames.

Optionally, the brightness adjustment mode of the first transition display frame is the current brightness adjustment mode, and the brightness adjustment mode of the second transition display frame is the brightness adjustment mode to which the display panel is to be switched.

Optionally, the duty cycle determination module 220 is specifically configured to divide the at least two transition display frames inserted in the brightness switching process into at least a first transition frame group and a second transition frame group after the first transition frame group when the current display refresh rate is lower than a preset refresh rate. A transition display frame in the first transition frame group is the first transition display frame and a transition display frame in the second transition frame group is the second transition display frame. A display refresh rate of each of a first transition display frame and a second transition display frame which are adjacent to each other is a set refresh rate. The set refresh rate is higher than or equal to the preset refresh rate.

Optionally, when the difference between the first display and light emission duty cycle and the second display and light emission duty cycle is greater than a preset duty cycle difference, the at least two transition display frames further include at least one third transition display frame between the first transition display frame and the second transition display frame. A display and light emission duty cycle of each of the at least one third transition display frame is between the first display and light emission duty cycle and the second display and light emission duty cycle. A display refresh rate of each of the at least one third transition display frame is the set refresh rate.

Optionally, the brightness adjustment mode of at least part of third transition display frames is the brightness adjustment mode to which the display panel is to be switched.

Optionally, ΔDuty1 denotes the difference between display and light emission duty cycles of a first transition display frame and a third transition display frame which are adjacent to each other, and ΔDuty2 denotes the difference between display and light emission duty cycles of a third transition display frame and a second transition display frame which are adjacent to each other. ΔDuty1 and ΔDuty2 are each within a preset duty cycle difference range.

Optionally, when the difference between the current display refresh rate and the set refresh rate is larger than a preset rate difference, the first transition frame group includes at least two first transition display frames. Two adjacent first transition display frames are the first first transition display frame and the second first transition display frame after the first first transition display frame, respectively. A display refresh rate of the first first transition display frame is higher than the current display refresh rate. A display refresh rate of the second first transition display frame is higher than the display refresh rate of the first first transition display frame.

Optionally, the difference between the display refresh rate of the first first transition display frame and the current display refresh rate is a first rate difference, and the difference between the display refresh rate of the second first transition display frame and the display refresh rate of the first first transition display frame is a second rate difference. The first rate difference and the second rate difference are each within a preset rate difference range.

Optionally, when the difference between the current display refresh rate and the set refresh rate is larger than the preset rate difference, the second transition frame group includes at least two second transition display frames. Two adjacent second transition display frames are the first second transition display frame and the second second transition display frame, respectively. A display refresh rate of the first second transition display frame is higher than a display refresh rate of the second second transition display frame. The display refresh rate of the second second transition display frame is higher than the current display refresh rate.

Optionally, the difference between the display refresh rate of the first second transition display frame and the display refresh rate of the second second transition display frame is a third rate difference, and the difference between the display refresh rate of the second second transition display frame and the current display refresh rate is a fourth rate difference. The third rate difference and the fourth rate difference are each within the preset rate difference range.

Optionally, the duty cycle determination module 220 is also specifically configured to determine two transition display frames inserted in the brightness switching process when the current display refresh rate is higher than or equal to the preset refresh rate. The two transition display frames are the first transition display frame and a fourth transition display frame after the first transition display frame, respectively. Each of the display refresh rate of the first transition display frame and a display refresh rate of the fourth transition display frame is the set refresh rate, and the set refresh rate is higher than the current display refresh rate. A display and light emission duty cycle of the fourth transition display frame is between the display and light emission duty cycle of the first transition display frame and the second display and light emission duty cycle.

Optionally, the brightness adjustment mode of the first transition display frame is the current brightness adjustment mode, and the brightness adjustment mode of the fourth transition display frame is the brightness adjustment mode to which the display panel is to be switched.

Optionally, A denotes the first display and light emission duty cycle, B denotes the second display and light emission duty cycle, and C denotes the display and light emission duty cycle of the fourth transition display frame, where the difference between $|A-C|$ and $|B-C|$ is within the preset duty cycle difference range.

Optionally, F0 denotes the maximum display refresh rate of each transition display frame, F1 denotes the current refresh rate of the display panel, and N transition display frames may be inserted in the brightness switching process, where $N \leq F0/F1$, and Nis a positive integer.

Optionally, the mode switching control module 230 is specifically configured to, if a current image of the display panel is the last frame in the current brightness adjustment mode, control the display panel to sequentially display images in the at least two transition display frames after the display panel displays the current image and control the display panel to display the first frame in the brightness mode to which the display panel is to be switched after the display panel completes the display of each of the images in the at least two transition display frames.

The display control device for the display panel provided in the embodiment of the present disclosure may perform the display control method for the display panel provided in the embodiment of the present disclosure. The display control device for the display panel has the corresponding structure capable of performing the display control method for the display panel provided in the embodiment of the present disclosure and can achieve the same beneficial effects as the display control method for the display panel provided in the embodiment of the present disclosure. The same details may be understood with reference to the preceding description of the display control method for the display panel. The details are not repeated here.

Based on the same inventive concept, an embodiment of the present disclosure further provides a display device. The display device includes a display panel and a driver chip. The driver chip is configured to drive the display panel to display an image and perform the display control method for the display panel provided in the embodiment of the present disclosure. Therefore, the driver chip has the corresponding structure capable of performing the display control method for the display panel provided in the embodiment of the present disclosure and can achieve the same beneficial effects as the display control method for the display panel provided in the embodiment of the present disclosure. The same details may be understood with reference to the preceding description of the display control method for the display panel. The details are not repeated here.

Figure 28:
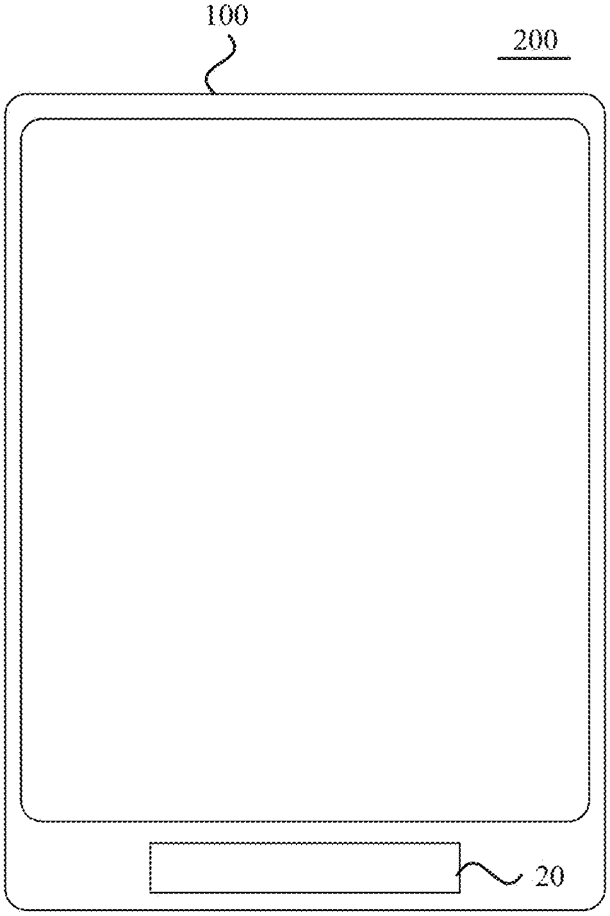
FIG. 28 is a structural diagram of a display device according to an embodiment of the present disclosure.

Exemplarily, FIG. 28 is a structural diagram of a display device according to the embodiment of the present disclosure. As shown in FIG. 28, a display device 200 includes a display panel 100 and a driver chip 20. The driver chip 20 drives the display panel 100 to perform a display. Exemplarily, the display device 200 may include but is not limited to a mobile phone, a television, a laptop, a desktop display, a tablet computer, a digital camera, a smart bracelet, a smart glass, a vehicle-mounted display, medical equipment, industrial control equipment, and a touch interactive terminal. No special limitations are made thereto in the embodiment of the present disclosure.

Based on the same inventive concept, an embodiment of the present disclosure further provides a computer-readable storage medium storing a computer instruction, where when executing the computer instruction, a processor performs the preceding display control method for the display panel provided in the embodiment of the present disclosure.

In the embodiment of the present disclosure, the computer-readable storage medium may be a tangible medium. The tangible medium may include or store the computer program used by or used in conjunction with an instruction execution system, apparatus, or device. The computer-readable storage medium may include but is not limited to an electronic, magnetic, optical, electromagnetic, infrared, or semiconductor system, apparatus, or device, or any appropriate combination thereof. Alternatively, the computer-readable storage medium may be a machine-readable signal medium. More specific examples of the machine-readable storage medium include an electrical connection having one or more wires, a portable computer diskette, a hard disk, a random-access memory (RAM), a read-only memory (ROM), an erasable programmable read-only memory (EPROM or Flash memory), an optical fiber, a portable compact disk read-only memory (CD-ROM), an optical storage device, a magnetic storage device, or any appropriate combination thereof.

It is to be noted that the preceding are preferred embodiments of the present disclosure and technical principles used therein. It is to be understood by those skilled in the art that the present disclosure is not limited to the embodiments described herein. For those skilled in the art, various apparent modifications, adaptations, and substitutions can be made without departing from the scope of the present disclosure. Therefore, though the present disclosure is described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A display control method for a display panel, comprising:

in response to a brightness adjustment mode of the display panel being switched, acquiring a first display and light emission duty cycle of a last frame in a current brightness adjustment mode and a second display and light emission duty cycle of a first frame in a brightness adjustment mode to which the display panel is to be switched;

determining, according to the first display and light emission duty cycle and the second display and light emission duty cycle, a display and light emission duty cycle of each of at least two transition display frames inserted in a brightness switching process, wherein the at least two transition display frames comprise at least one of a first transition display frame or a second transition display frame, a display and light emission duty cycle of the first transition display frame is equal to the first display and light emission duty cycle, a display and light emission duty cycle of the second transition display frame is equal to the second display and light emission duty cycle, and a display refresh rate of each of the at least two transition display frames is higher than or equal to a current display refresh rate of the display panel; and controlling the display panel to switch the brightness adjustment mode according to the display and light emission duty cycle of each of the at least two transition display frames.

2. The display control method for a display panel according to claim 1, wherein a brightness adjustment mode of the first transition display frame is the current brightness adjustment mode, and a brightness adjustment mode of the second transition display frame is the brightness adjustment mode to which the display panel is to be switched.

3. The display control method for a display panel according to claim 1, wherein determining, according to the first display and light emission duty cycle and the second display and light emission duty cycle, the display and light emission duty cycle of each of the at least two transition display frames inserted in the brightness switching process comprises:

in response to the current display refresh rate being lower than a preset refresh rate, dividing the at least two transition display frames inserted in the brightness switching process into at least a first transition frame group and a second transition frame group after the first transition frame group;

wherein a transition display frame in the first transition frame group is the first transition display frame and a transition display frame in the second transition frame group is the second transition display frame, a display refresh rate of each of a first transition display frame and a second transition display frame which are adjacent to each other is a set refresh rate, and the set refresh rate is higher than or equal to the preset refresh rate.

4. The display control method for a display panel according to claim 3, wherein in response to a difference between the first display and light emission duty cycle and the second display and light emission duty cycle is larger than a preset duty cycle difference, the at least two transition display frames further comprise at least one third transition display frame between the first transition display frame and the second transition display frame; and a display and light emission duty cycle of each of the at least one third transition display frame is between the first display and light emission duty cycle and the second display and light emission duty cycle, and a display refresh rate of each of the at least one third transition display frame is the set refresh rate.

5. The display control method for a display panel according to claim 4, wherein a brightness adjustment mode of at least part of the at least one third transition display frame is the brightness adjustment mode to which the display panel is to be switched.

6. The display control method for a display panel according to claim 4, wherein ΔDuty1 denotes a difference between display and light emission duty cycles of a first transition display frame and a third transition display frame which are adjacent to each other; and ΔDuty2 denotes a difference between display and light emission duty cycles of a third transition display frame and a second transition display frame which are adjacent to each other;

wherein each of ΔDuty1 and ΔDuty2 is within a preset duty cycle difference range.

7. The display control method for a display panel according to claim 3, wherein in response to a difference between the current display refresh rate and the set refresh rate being larger than a preset rate difference, the first transition frame group comprises at least two first transition display frames;

wherein two adjacent first transition display frames of the at least two first transition display frames are a first first transition display frame and a second first transition display frame after the first first transition display frame, respectively, a display refresh rate of the first first transition display frame is higher than the current display refresh rate, and a display refresh rate of the second first transition display frame is higher than the display refresh rate of the first first transition display frame.

8. The display control method for a display panel according to claim 7, wherein a first rate difference is a difference between the display refresh rate of the first first transition display frame and the current display refresh rate; and a second rate difference is a difference between the display refresh rate of the second first transition display frame and the display refresh rate of the first first transition display frame;

wherein each of the first rate difference and the second rate difference is within a preset rate difference range.

9. The display control method for a display panel according to claim 3, wherein in response to a difference between the current display refresh rate and the set refresh rate being larger than a preset rate difference, the second transition frame group comprises at least two second transition display frames;

wherein two adjacent second transition display frames of the at least two second transition display frames are a first second transition display frame and a second second transition display frame, respectively, a display refresh rate of the first second transition display frame is higher than a display refresh rate of the second second transition display frame, and the display refresh rate of the second second transition display frame is higher than the current display refresh rate.

10. The display control method for a display panel according to claim 9, wherein a third rate difference is a difference between the display refresh rate of the first second transition display frame and the display refresh rate of the second second transition display frame; and a fourth rate difference is a difference between the display refresh rate of the second second transition display frame and the current display refresh rate;

wherein each of the third rate difference and the fourth rate difference is within a preset rate difference range.

11. The display control method for a display panel according to claim 3, wherein determining, according to the first display and light emission duty cycle and the second display and light emission duty cycle, the display and light emission duty cycle of each of the at least two transition display frames inserted in the brightness switching process further comprises:

in response to the current display refresh rate being higher than or equal to the preset refresh rate, determining two transition display frames inserted in the brightness switching process, wherein the two transition display frames are the first transition display frame and a fourth transition display frame after the first transition display frame, respectively, each of a display refresh rate of the first transition display frame and a display refresh rate of the fourth transition display frame is the set refresh rate, and the set refresh rate is higher than the current display refresh rate;

wherein a display and light emission duty cycle of the fourth transition display frame is between the display and light emission duty cycle of the first transition display frame and the second display and light emission duty cycle.

12. The display control method for a display panel according to claim 11, wherein a brightness adjustment mode of the first transition display frame is the current brightness adjustment mode, and a brightness adjustment mode of the fourth transition display frame is the brightness adjustment mode to which the display panel is to be switched.

13. The display control method for a display panel according to claim 11, wherein A denotes the first display and light emission duty cycle, B denotes the second display and light emission duty cycle, and C denotes the display and light emission duty cycle of the fourth transition display frame;

wherein a difference between $|A-C|$ and $|B-C|$ is within a preset duty cycle difference range.

14. The display control method for a display panel according to claim 1, wherein F0 denotes a maximum display refresh rate of each of the at least two transition display frames, and F1 denotes the current refresh rate of the display panel; and N transition display frames are inserted in the brightness switching process;

wherein $N \leq F0/F1$, and N is a positive integer.

15. The display control method for a display panel according to claim 1, wherein controlling the display panel to switch the brightness adjustment mode according to the display and light emission duty cycle of each of the at least two transition display frames comprises:

in response to a current image of the display panel being the last frame in the current brightness adjustment mode, controlling the display panel to sequentially display images in the at least two transition display frames after the display panel displays the current image; and controlling the display panel to display a first frame in the brightness mode to which the display panel is to be switched after the display panel completes a display of each of the images in the at least two transition display frames.

16. A display control device for a display panel, comprising:

a duty cycle acquisition module, which is configured to: in response to a brightness adjustment mode of the display panel being switched, acquire a first display and light emission duty cycle of a last frame in a current brightness adjustment mode and a second display and light emission duty cycle of a first frame in a brightness adjustment mode to which the display panel is to be switched;

a duty cycle determination module, which is configured to determine, according to the first display and light emission duty cycle and the second display and light emission duty cycle, a display and light emission duty cycle of each of at least two transition display frames inserted in a brightness switching process, wherein the at least two transition display frames comprise a first transition display frame and/or a second transition display frame, a display and light emission duty cycle of the first transition display frame is equal to the first display and light emission duty cycle, and a display and light emission duty cycle of the second transition display frame is equal to the second display and light emission duty cycle; and a mode switching control module, which is configured to control the display panel to switch the brightness adjustment mode according to the display and light emission duty cycle of each of the at least two transition display frames.

17. A display device, comprising a display panel and a driver chip;

wherein the driver chip is configured to drive the display panel to display an image and perform a display control method for a display panel, wherein the display control method comprises:

in response to a brightness adjustment mode of the display panel being switched, acquiring a first display and light emission duty cycle of a last frame in a current brightness adjustment mode and a second display and light emission duty cycle of a first frame in a brightness adjustment mode to which the display panel is to be switched;

determining, according to the first display and light emission duty cycle and the second display and light emission duty cycle, a display and light emission duty cycle of each of at least two transition display frames inserted in a brightness switching process, wherein the at least two transition display frames comprise at least one of a first transition display frame or a second transition display frame, a display and light emission duty cycle of the first transition display frame is equal to the first display and light emission duty cycle, a display and light emission duty cycle of the second transition display frame is equal to the second display and light emission duty cycle, and a display refresh rate of each of the at least two transition display frames is higher than or equal to a current display refresh rate of the display panel; and controlling the display panel to switch the brightness adjustment mode according to the display and light emission duty cycle of each of the at least two transition display frames.

* * * * *